(12) United States Patent
Wang et al.

(10) Patent No.: US 11,016,226 B2
(45) Date of Patent: May 25, 2021

(54) VARIFOCAL POLARIZATION SENSITIVE DIFFUSIVE DISPLAY

(71) Applicant: Facebook Technologies, LLC, Menlo Park, CA (US)

(72) Inventors: Mengfei Wang, Seattle, WA (US); Gang Li, Bothell, WA (US); Lu Lu, Kirkland, WA (US); Yunqi Li, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/714,441

(22) Filed: Dec. 13, 2019

(65) Prior Publication Data

US 2021/0088700 A1    Mar. 25, 2021

Related U.S. Application Data

(60) Provisional application No. 62/902,831, filed on Sep. 19, 2019, provisional application No. 62/902,823, filed on Sep. 19, 2019.

(51) Int. Cl.
| | |
|---|---|
| *G02B 5/02* | (2006.01) |
| *G02B 27/28* | (2006.01) |
| *G02B 27/01* | (2006.01) |
| *G02F 1/13357* | (2006.01) |

(52) U.S. Cl.
CPC ....... *G02B 5/0278* (2013.01); *G02B 27/0172* (2013.01); *G02B 27/286* (2013.01); *G02F 1/13362* (2013.01); *G02B 2027/0178* (2013.01)

(58) Field of Classification Search
CPC .. G02B 5/0278; G02B 5/0284; G02B 5/0289; G02B 27/0172; G02B 27/286; G02B 2027/0178; G02B 27/0101; G02F 1/13362
See application file for complete search history.

(56) References Cited

U.S. PATENT DOCUMENTS

2006/0181769 A1* 8/2006 Kumasawa ............ G03B 21/62
                                                              359/449

OTHER PUBLICATIONS

Facebook Technologies, LLC, International Search Report and Written Opinion, PCT/US2020/045539, dated Oct. 20, 2020, 9 pgs.
(Continued)

*Primary Examiner* — Ryan D Howard
(74) *Attorney, Agent, or Firm* — Morgan, Lewis & Bockius LLP

(57) ABSTRACT

A variofocal display device includes an image source and a display. The image source is configured to project image light. The display includes a first optical diffuser and a second optical diffuser. The display is configured to receive the image light. The first diffuser is configured to diffuse the image light at the first optical diffuser when the image light has a first polarization, and to diffuse the image light at the second optical diffuser when the image light is configured has a second polarization different from the first polarization. A method of displaying images using a varifocal display device is also disclosed.

19 Claims, 19 Drawing Sheets

(56) References Cited

OTHER PUBLICATIONS

Guanjun Tan et al., "Polarization-multiplexed multiplane display," Optics Letters, vol. 43, No. 22, Nov. 15, 2018, 4 pgs.
Lu Lu et al., "Liquid Crystal Technology for Solving Key Optical Challenges in Virtual and Augmented Realities," SID International Symposium, Digest of Technical Papers, 59-1-L. Lu, vol. 50, No. 1, May 29, 2019, 4 pgs.
Moon et al., "Layered Display with Accommodation Cue Using Scattering Polarizers," IEEE Journal of Selected Topics in Signal Processing, IEEE, U.S., vol. 11, No. 7, Oct. 23, 2017, 9 pgs.

\* cited by examiner

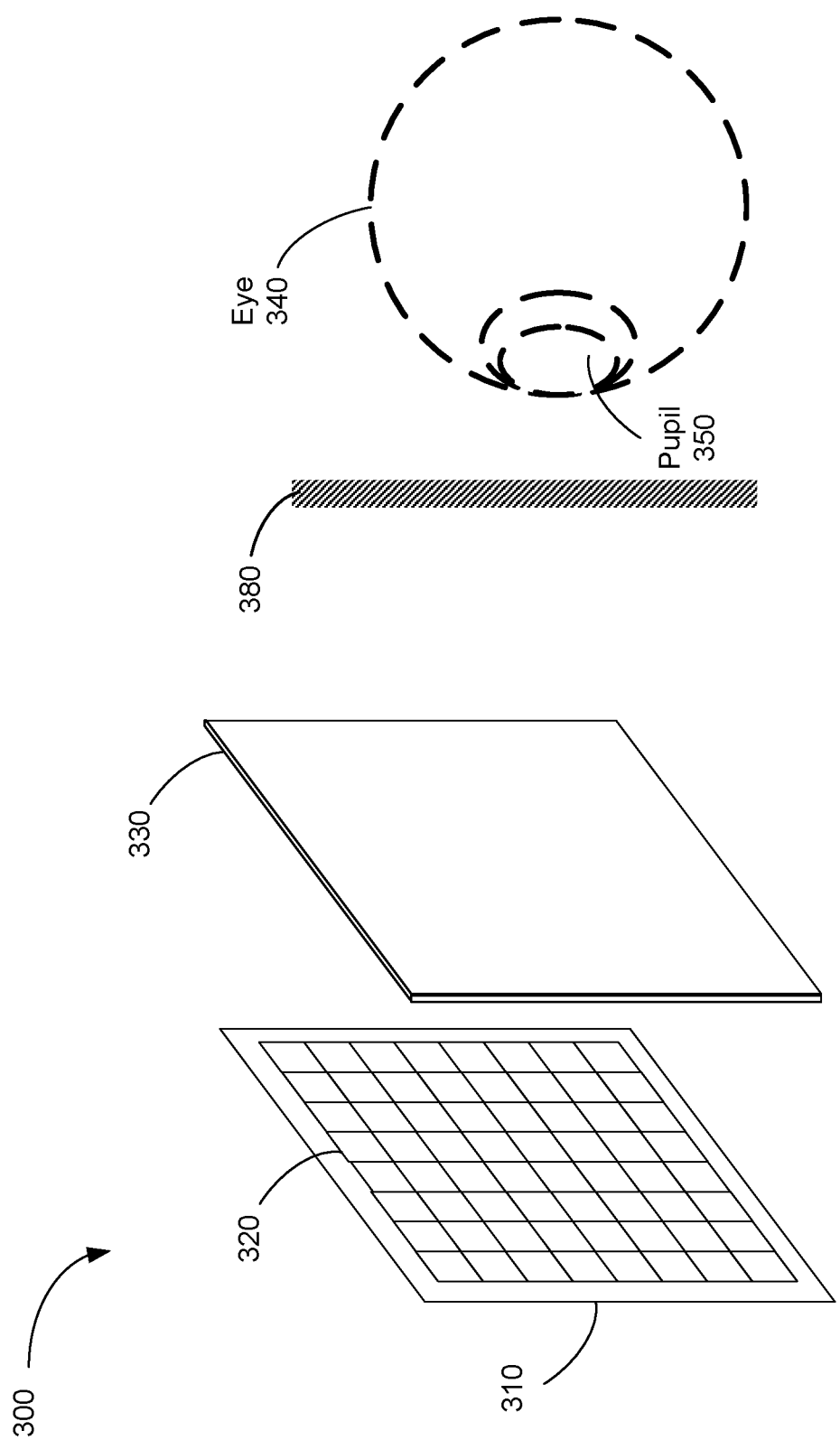

700

710 Provide image light from an image source.

720 Receive the image light at a first optical diffuser.

730 When the image light received at the first optical diffuser has a first polarization, diffuse the image light at the first optical diffuser to output first diffused image light having the first polarization.

740 When the image light received at the first optical diffuser has a second polarization that is different from the first polarization:

(i) transmit the image light through the first optical diffuser, (ii) convert the image light from the second polarization to the first polarization, (iii) diffuse the image light having the first polarization at a second optical diffuser to output second diffused image light having the first polarization, (iv) convert the second diffused image light from the first polarization to the second polarization, and (v) transmit the second diffused image light having the second polarization through the first optical diffuser.

Figure 7

VARIFOCAL POLARIZATION SENSITIVE DIFFUSIVE DISPLAY

RELATED APPLICATIONS

This application claims the benefit of, and priority to, U.S. Provisional Patent Application Ser. No. 62/902,831, filed Sep. 19, 2019 and U.S. Provisional Patent Application Ser. No. 62/902,823, filed Sep. 19, 2019, both of which are incorporated by reference herein in their entireties.

This application is related to U.S. patent application Ser. No. 16/714,430, entitled "Polarization Sensitive Optical Diffuser", filed Dec. 13, 2019, which claims priority to U.S. Provisional Patent Application Ser. No. 62/902,823, filed Sep. 19, 2019 and U.S. Provisional Patent Application Ser. No. 62/902,831, filed Sep. 19, 2019, each of which is incorporated by reference herein in their entireties.

TECHNICAL FIELD

This relates generally to display devices, and more specifically to head-mounted display devices.

BACKGROUND

Head-mounted display devices (also called herein head-mounted displays) are gaining popularity as means for providing visual information to a user. For example, some head-mounted display devices are used for virtual reality and augmented reality operations.

When using head-mounted display devices for AR applications, it may be desirable for the display device to seamlessly transmit ambient light to a user's eyes while projecting one or more images to the user's eyes.

SUMMARY

Accordingly, there is a need for a head-mounted display device that has adjustable optical power and can transmit both ambient light and project image light to a user's eyes. Additionally, it may be desirable for display devices to have adjustable optical power to decrease eye fatigue and improve user comfort and satisfaction with such devices.

Thus, the above deficiencies and other problems associated with conventional head-mounted display devices are reduced or eliminated by the disclosed display devices.

In accordance with some embodiments, a display device includes an image source and a display. The image source is configured to project image light. The display includes a first optical diffuser and a second optical diffuser. The display is configured to receive the image light, diffuse the image light at the first diffuser when the image light has a first polarization, and diffuse the image light at the second diffuser when the image light has a second polarization that is different from (e.g., orthogonal to) the first polarization.

In accordance with some embodiments, a display device includes an image source configured to project image light. The image light is configurable to have a first circular polarization or a second circular polarization that is different from (e.g., orthogonal to) the first polarization. The display also includes a display that has a first optical diffuser and a second optical diffuser. The display is configured to receive the image light, diffuse the image light at the first diffuser when the image light is configured to have the first polarization, and diffuse the image light at the second diffuser when the image light is configured to have the second polarization.

In accordance with some embodiments, a method of displaying images includes providing image light from an image source and receiving the image light at a first optical diffuser. The method also includes, when the image light received at the first optical diffuser has a first polarization, diffusing the image light at the first optical diffuser to output first diffused image light having the first polarization. The method further includes, when the image light received at the first optical diffuser has a second polarization different from the first polarization: (i) transmitting the image light through the first optical diffuser, (ii) converting the image light from the second polarization to the first polarization, (iii) diffusing the image light having the first polarization at a second optical diffuser to output second diffused image light having the first polarization, (iv) converting the second diffused image light from the first polarization to the second polarization, and (v) transmitting the second diffused image light having the second polarization through the first optical diffuser.

In accordance with some embodiments, a method of displaying images includes projecting first image light having first circular polarization. The method also includes diffusing the first image light at a first optical diffuser to output first diffused image light, the first diffused image light having the first polarization. The method further includes projecting second image light having a second circular polarization that is different from (e.g., orthogonal to) the first polarization, transmitting the second image light through the first optical diffuser, and converting the second image light into third image light having the first polarization. The method also includes diffusing the third image light at a second optical diffuser to output second diffused image light, the second diffused image light having the first polarization, converting the second diffused image light into third diffused image light having the second polarization, and transmitting the third diffused image light through the first optical diffuser.

Thus, the disclosed embodiments provide a varifocal polarization selective diffusive display that has adjustable optical power and is capable of diffusing image light having a first polarization and transmitting ambient light that has a polarization different from the first polarization without diffusing the ambient light or adding significant aberration or distortion.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3 is an isometric view of a display device in accordance with some embodiments.

FIG. 7 is a flowchart of a method of displaying images in accordance with some embodiments.

Figure 1:
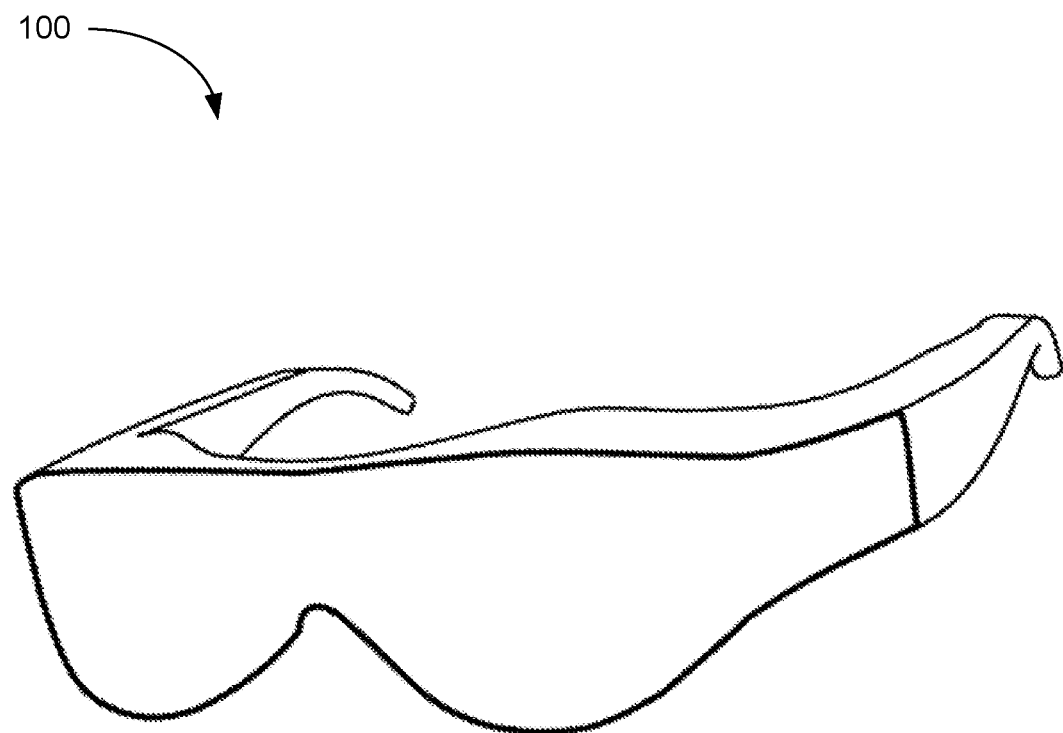
FIG. 1 is a perspective view of a display device in accordance with some embodiments.

These figures are not drawn to scale unless indicated otherwise.

DETAILED DESCRIPTION

The present disclosure provides a head-mounted display device (or display device) that projects diffuse image light having a first polarization to a user and transmits ambient light having a second polarization to the user without diffusing the ambient light. Additionally, the head-mounted display device has adjustable optical power that alleviates eye fatigue or user discomfort associated with vergence accommodation conflict. In some embodiments, the ambient light is transmitted to the viewer without significant optical aberrations or distortions, in order to allow the user of the display device to accurately perceive and interact with objects in the outside environment.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first light projector could be termed a second light projector, and, similarly, a second light projector could be termed a first light projector, without departing from the scope of the various described embodiments. The first light projector and the second light projector are both light projectors, but they are not the same light projector.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates a perspective view of display device 100 in accordance with some embodiments. In some embodiments, display device 100 is configured to be worn on a head of a user (e.g., by having the form of spectacles or eyeglasses, as shown in FIG. 1, or to be included as part of a helmet that is to be worn by the user). When display device 100 is configured to be worn on a head of a user, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed-reality contents, or any combination thereof) to a user.

Figure 2:
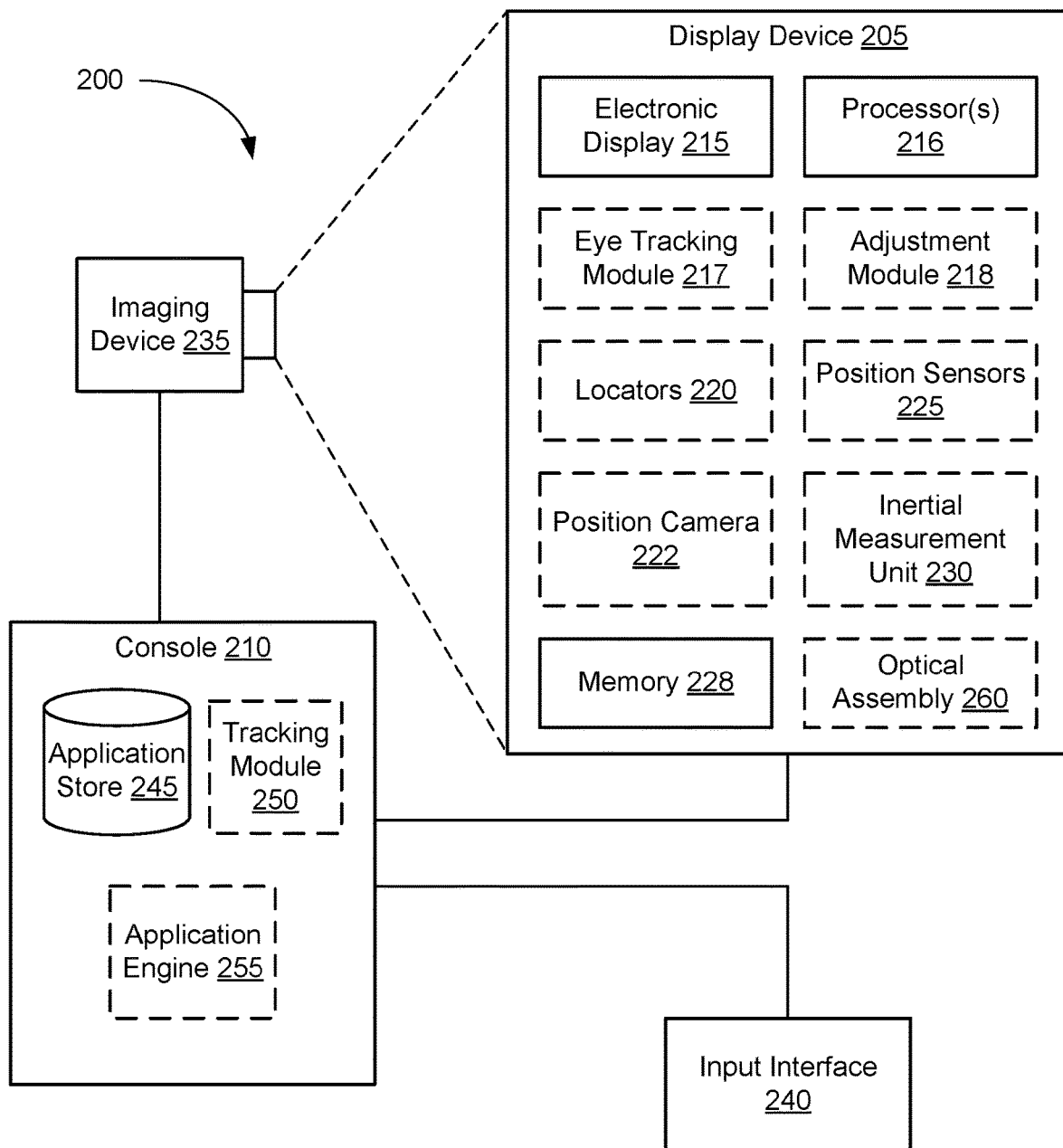
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed-reality by adding in a view of the real surroundings. Thus, display device 205 and system 200 described here can deliver augmented reality, virtual reality, and mixed-reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more optical assemblies 260, or a subset or superset thereof (e.g., display device 205 with electronic display 215, optical assembly 260, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to project images to the user through one or more optical assemblies 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more optical components in the one or more optical assemblies 260 direct light from the arrays of light emission devices (optionally through the emission intensity arrays) to locations within each eyebox. An eyebox (e.g., eyebox 380, shown in FIG. 3) is a region that is occupied by an eye of a user of display device 205 (e.g., a user wearing display device 205) who is viewing images from display device 205. In some embodiments, the eyebox is represented as a 10 mm×10 mm square. In some embodiments, the one or more optical components include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, this sends a discrete image to the display that will tile sub-images together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light toward the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 includes one or more optical assemblies 260, which can include a single optical assembly 260 or multiple optical assemblies 260 (e.g., an optical assembly 260 for each eye of a user). In some embodiments, the one or more optical assemblies 260 receive image light for the computer generated images from the electronic display 215 and direct the image light toward an eye or eyes of a user. The computer-generated images include still images, animated images, and/or a combination thereof. The computer-generated images include objects that appear to be two-dimensional and/or three-dimensional objects.

In some embodiments, electronic display 215 projects computer-generated images to one or more reflective elements (not shown), and the one or more optical assemblies 260 receive the image light from the one or more reflective elements and direct the image light to the eye(s) of the user. In some embodiments, the one or more reflective elements are partially transparent (e.g., the one or more reflective elements have a transmittance of at least 15%, 20%, 25%, 30%, 35%, 40%, 45%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor 216, is used for generating content for presentation to the user. Content generated by the processor 216 based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators 220 on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators 220 from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3 is an isometric view of a display device 300, which corresponds to part of or all of display device 100 (see FIG. 1) in accordance with some embodiments. In some embodiments, display device 300 includes an emission array 310 (e.g., a light emission device array or reflective element), and an optical assembly (e.g., optical assembly 260) having one or more optical components 330 (e.g., lenses). In some embodiments, display device 300 also includes an IR detector array.

In some embodiments, light emission device array 310 emits image light and optional IR light toward the optical components 330. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR).

In some embodiments, display device 300 includes an emission intensity array configured to selectively attenuate light emitted from light emission array 310. In some embodiments, the emission intensity array is composed of a plurality of liquid crystal cells or pixels, groups of light emission devices 320, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to control what portion of the image light emitted from light emission device array 310 is passed to the one or more optical components 330. In some embodiments, display device 300 uses an emission intensity array to facilitate providing image light to a location of pupil 350 of eye 340 of a user, and minimize the amount of image light provided to other areas in the eyebox 380.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and an emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more optical components 330 toward the determined location of pupil 350, and not toward another presumed location.

In some embodiments, display device 300 includes one or more broadband sources (e.g., one or more white LEDs) coupled with a plurality of color filters, in addition to, or instead of, light emission device array 310.

One or more optical components 330 receive the image light (or modified image light, e.g., attenuated light) from emission array 310, and direct the image light to a detected or presumed location of the pupil 350 of an eye 340 of a user. In some embodiments, the one or more optical components 330 include one or more optical assemblies 260.

FIGS. 4A-4E are schematic diagrams illustrating a display device in accordance with some embodiments.

Figure 4A:
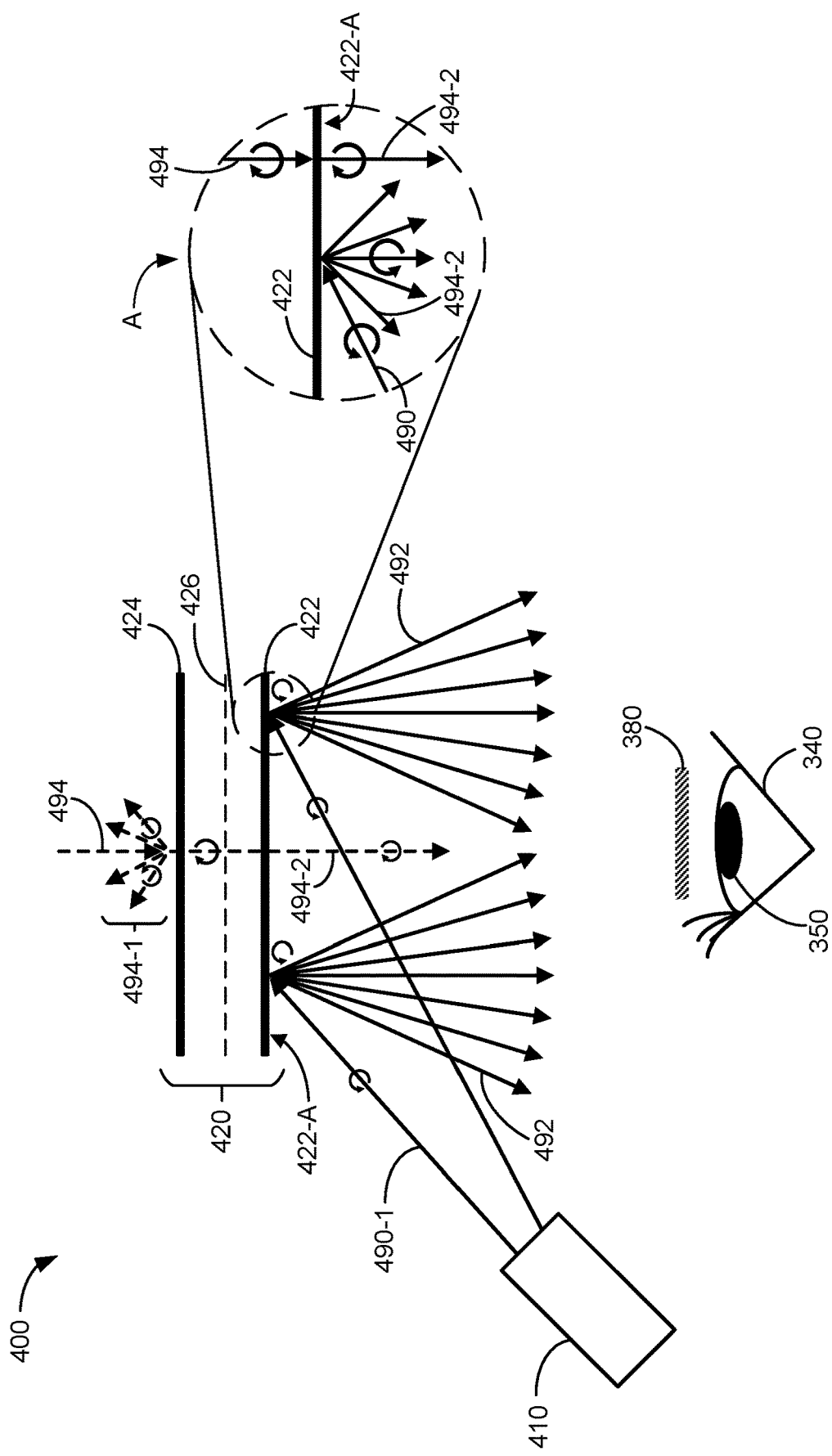
FIGS. 4A-4F are schematic diagrams illustrating a display device in accordance with some embodiments.
Figure 4B:
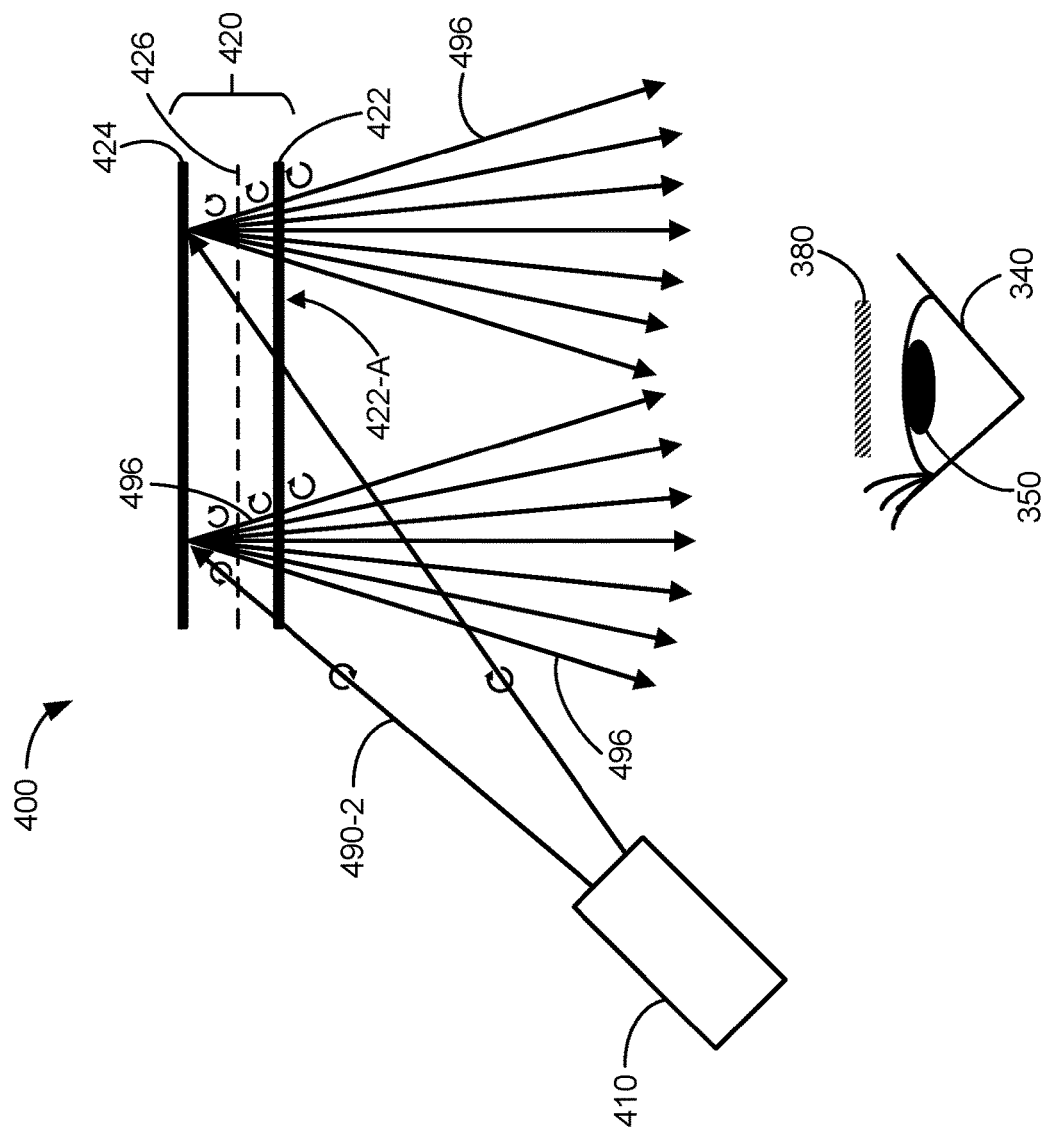

FIG. 4A is a schematic diagram illustrating a varifocal polarization sensitive diffusive display device (referred to hereafter as "display device") 400, according to certain embodiments. As shown, display device 400 includes an image source 410 configured to provide (e.g., project, output, generate, emit) image light corresponding to images to be displayed, and a display 420 configured to display the images. In some embodiments, the image light provided by the image source 410 may have any of: a first polarization, a second polarization different from (e.g., orthogonal to) the first polarization, or a combination of more than one polarization. For example, in some embodiments, the image light is configurable to be first image light 490-1 having first polarization or second image light 490-2 having second polarization. In some embodiments, the first polarization is right-handed polarization or RCP, and the second polarization is left-handed polarization or LCP, or vice versa. In some embodiments, display 420 includes a plurality of optical diffusers (e.g., a first optical diffuser 422 and a second optical diffuser 424). Display 420 is configured to: (1) receive first image light 490-1 and diffuse the first image light 490-1 at first optical diffuser 422 (as shown in FIG. 4A), or (2) receive second image light 490-2 and diffuse the second image light 490-2 at second optical diffuser 424 (as shown in FIG. 4B).

In some embodiments, each of the first optical diffuser 422 and the second optical diffuser 424 is configured to diffuse light having the first polarization and to transmit light having the second polarization. For example, as shown in inset A of FIG. 4A, first optical diffuser 422 is configured to diffuse first image light 490-1 having the first polarization as first diffused image light 492.

As shown in FIG. 4A, ambient light 494, which may be unpolarized, may be incident upon the second optical diffuser 424. A first portion 494-1 of the ambient light 494 having the first polarization (e.g., RCP) is diffused at the second optical diffuser 424, and a second portion 494-2 of the ambient light 494 having the second polarization (e.g., LCP) is transmitted through both the second optical diffuser 424 and the first optical diffuser 422.

In some embodiments, as shown in FIG. 4A, first optical diffuser 422 includes a first surface 422-A, and is configured to receive the first image light 490-1 at the first surface 422-A and to output the first diffused image light 492 from the first surface 422-A (e.g., reflectively diffuse the first image light 490-1 at the first surface 422-A). Additional details regarding the first optical diffuser 422 and the second optical diffuser 424 are provided below with respect to FIGS. 5A-5D and FIGS. 6A-6D.

In some embodiments, display device 400 also includes a first optical retarder 426 that is disposed between the first optical diffuser 422 and the second optical diffuser 424. As shown in FIG. 4B, when the display 420 receives second image light 490-2 having the second polarization, the first optical diffuser 422 is configured to transmit the second image light 490-2. The first optical retarder 426 is configured to receive the second image light 490-2 that has been transmitted through the first optical diffuser 422, and to convert the polarization of the second image light 490-2 such that after transmitting through the first optical retarder 426, second image light 490-2 has the first polarization and is diffused by the second optical diffuser 424 as second diffused image light 496 also having the first polarization. The first optical retarder 426 is further configurable to receive the second diffused image light 496, and to convert the polarization of the second diffused image light 496 from the first polarization to the second polarization such that the second diffused image light 496 is transmitted by the first optical diffuser 422.

In the ideal case, light is transmitted through an optical diffuser without diffusion. For instance, in the ideal case, the second image light 490-2 having the second polarization is transmitted through the first optical diffuser 422 without any diffusion. In some cases, a small amount of the transmitted light may be diffused. For example, a small, non-zero amount of the second image light 490-2 may be diffused by the first optical diffuser 422. However, a portion of the diffuse light compared to the incident light for a configuration in which an optical diffuser causes transmission of (most of) the incident light is less than a portion of the diffuse light compared to the incident light for a configuration in which an optical diffuser causes diffusion of the incident light. For example, an optical diffuser causes diffusion of less than 50% (e.g., less than 5%) of the incident light while the optical diffuser allows transmission of the incident light and the optical diffuser causes diffusion of greater than 50% (e.g., greater than 95%) of the incident light while the optical diffuser allows diffusion of the incident light).

Thus, in some embodiments, the first optical diffuser 422 is configured to output first diffused image light 492 by diffusing the first image light 490-1 (as shown in FIG. 4A), and the second optical diffuser 424 is configured to output second diffused image light 496 by diffusing the second image light 490-2 having the second polarization (as shown in FIG. 4B). In some embodiments, the first diffused image light 492 has the first polarization and the second diffused image light 496 has the second polarization.

Figure 4C:
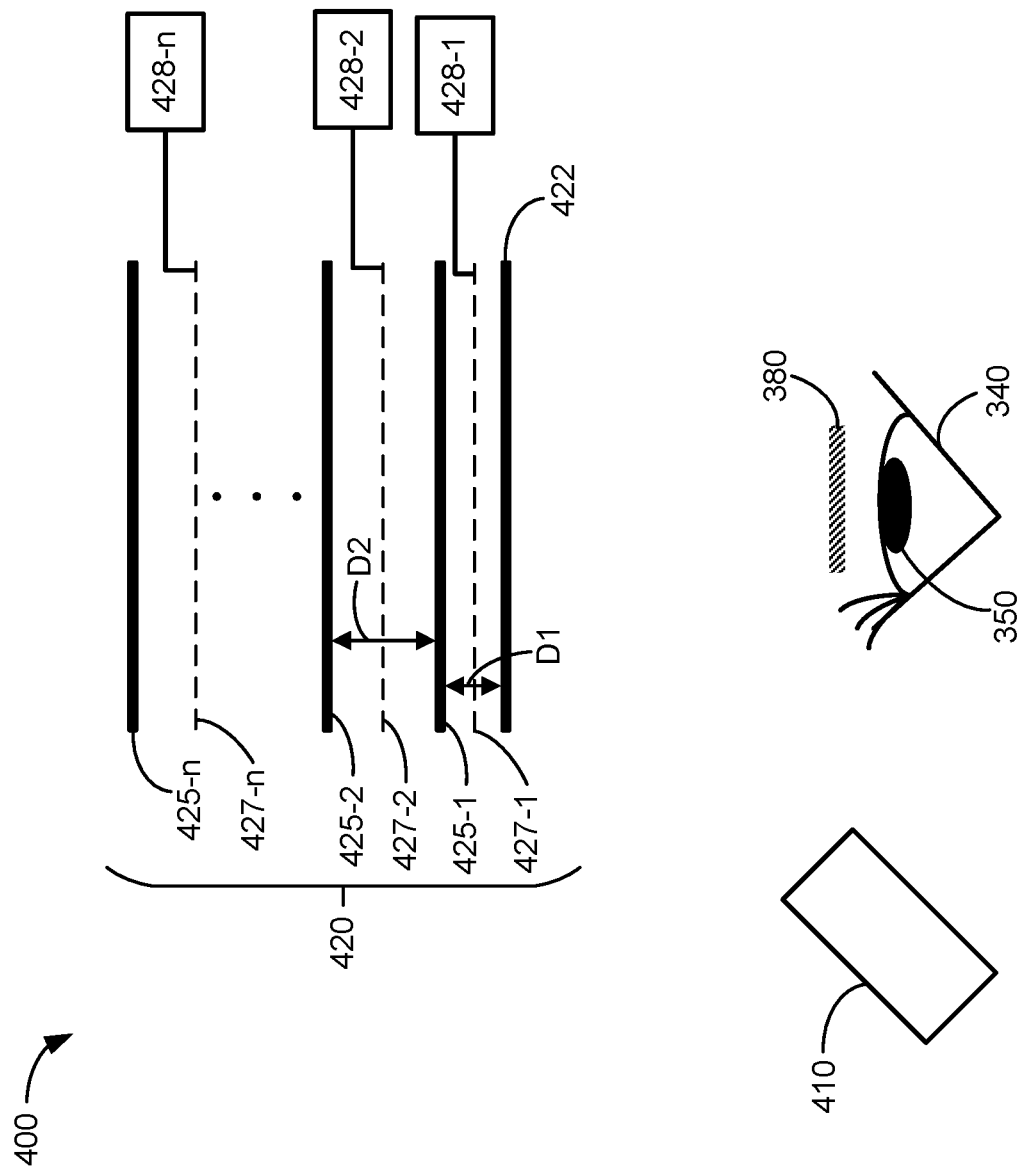
Figure 4D:
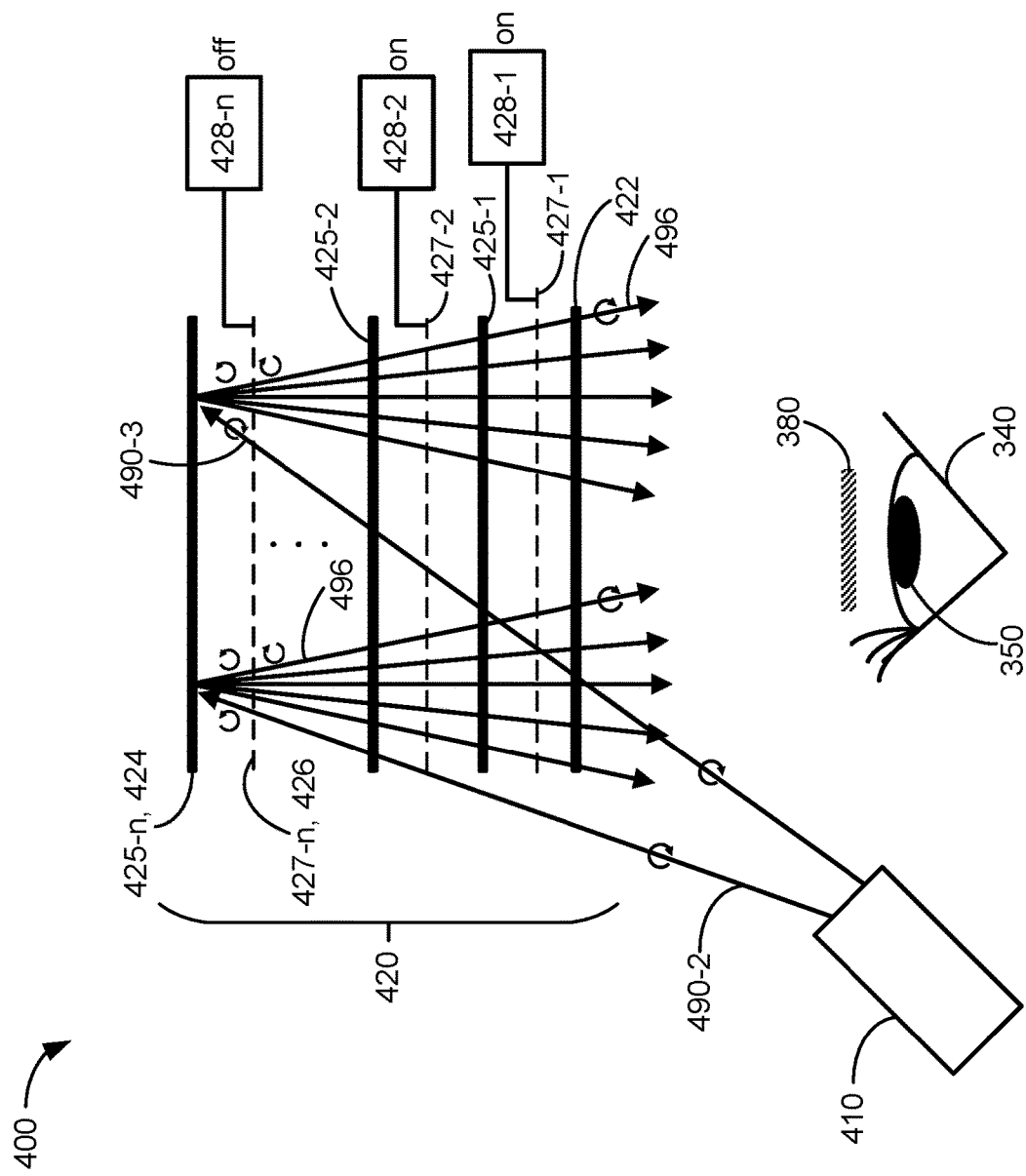
Figure 4E:
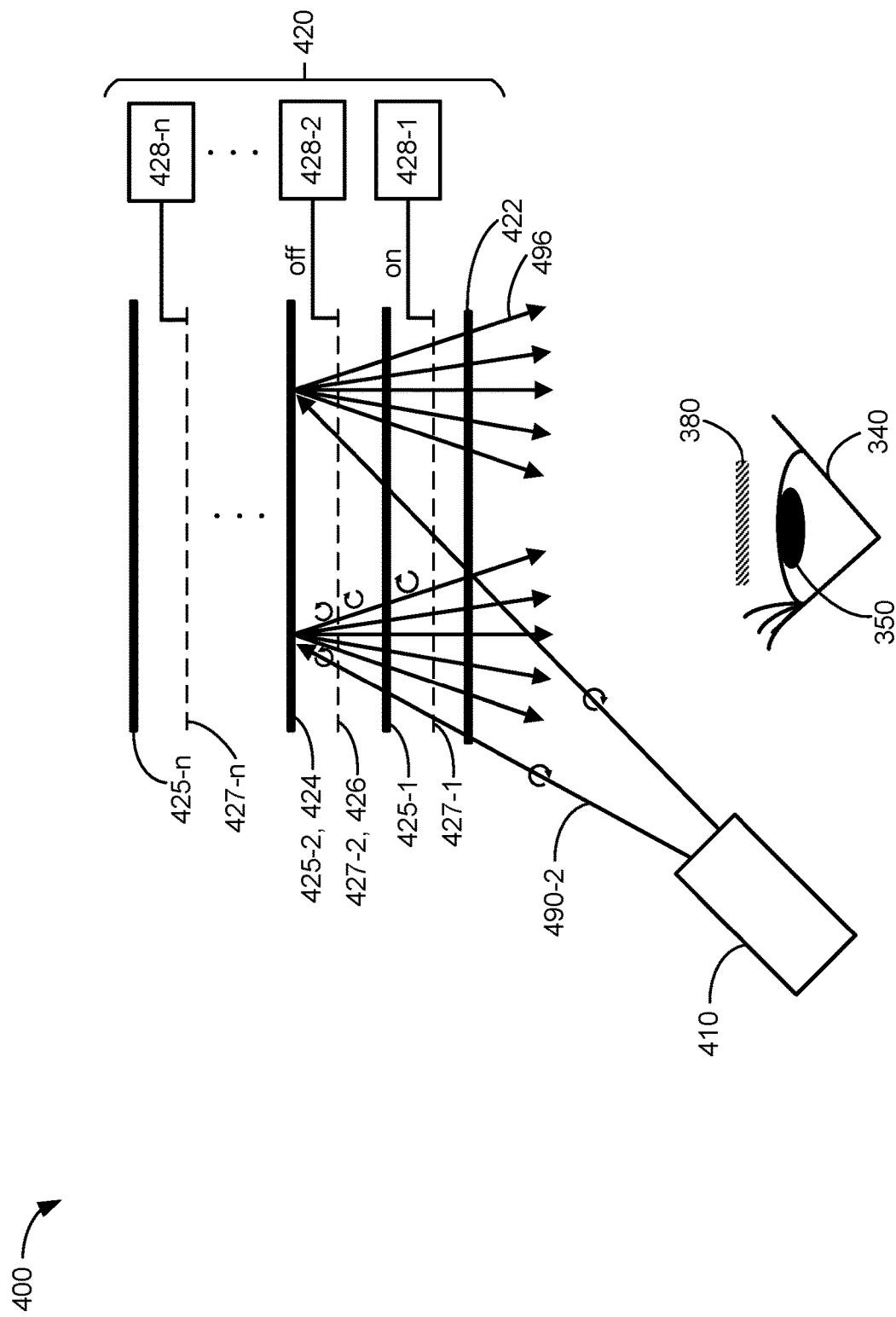

In some embodiments, as shown in FIGS. 4C-4E, display 420 may include more than two optical diffusers (e.g., first optical diffuser 422, and optical diffusers 425-1, 425-2, and 425-n, n>1).

In some embodiments, a distance between any two adjacent optical diffusers in display 420 is larger than 50 micrometers, 100 micrometers, 500 micrometers, 1 millimeter, 2 millimeters, 4 millimeters, 5 millimeters, 10 millimeters, or 50 millimeters. For example, as shown in FIG. 4C, first optical diffuser 422 is spaced apart from optical diffuser 425-1 by distance D1 that is larger than 50 micrometers, 100 micrometers, 500 micrometers, 1 millimeter, 2 millimeters, 4 millimeters, 5 millimeters, 10 millimeters, or 50 millimeters and optical diffuser 425-1 is spaced apart from optical diffuser 425-2 by distance D2 that is larger than 50 micrometers, 100 micrometers, 500 micrometers, 1 millimeter, 2 millimeters, 4 millimeters, 5 millimeters, 10 millimeters, or 50 millimeters. Thus, first optical diffuser 422 is spaced apart from any of optical diffusers 425 (e.g., optical diffusers 425-1, 425-2, and 425-n) by a distance that is larger than 50 micrometers, 100 micrometers, 500 micrometers, 1 millimeter, 2 millimeters, 4 millimeters, 5 millimeters, 10 millimeters, or 50 millimeters. In some embodiments, as shown in FIG. 4C, distance D2 is different from distance D1. In some embodiments, distances D1 and D2 are substantially the same (e.g., within +/−0.5 millimeters).

In some embodiments, display 420 includes one or more third optical diffusers disposed between the first optical diffuser 422 and the second optical diffuser 424.

In some embodiments, display 420 also includes optical retarders 427-1, 427-2, and 427-n corresponding to optical diffusers 425-1, 425-2, and 425-n, respectively. Each of the optical retarders (e.g., optical retarder 427-2) is disposed between the respective optical diffuser (e.g., optical diffuser 425-2) and first optical diffuser 422, and between the respective optical diffuser (e.g., optical diffuser 425-2) and an adjacent optical diffuser (e.g., optical diffuser 425-1). In some embodiments, any (e.g., some or all) of optical retarders 427-1, 427-2, and 427-n can be a switchable optical retarder (e.g., an active optical retarder) that is configurable to be in any of a first state and a second state (e.g., an "off" state and an "on" state), and display device 420 further includes controllers 428-1, 428-2, and 428-n coupled to optical retarders 427-1, 427-2, and 427-n, respectively, and configured to control the respective states of optical retarders 427-1, 427-2, and 427-n. Operation of switchable optical retarders is described below with respect to FIGS. 4G and 4H.

In some embodiments, by configuring the states of optical retarders 427-1, 427-2, and 427-n using controllers 428-1, 428-2, and 428-n, any of optical diffusers 425-1, 425-2, and 425-n (e.g., optical retarder 425-i, i=1, 2, . . . , n) can be selected to act as second optical diffuser 424 configured to output second diffused image light 496 by diffusing second image light 490-2 (as shown in FIG. 4B) and the corresponding optical retarder (e.g., optical retarder 427-i) would function as first optical retarder 426. For example, as shown in FIG. 4D, to have optical diffuser 425-n act as second optical diffuser 424 and optical retarder 427-n function as first optical retarder 426, the states of optical retarders 427-1 through 427-(n−1) are set to be "on" and the state of optical retarder 427-n is set to be "off." In this way, optical retarders 427-1 through 427-(n−1) are configured to transmit the second image light 490-2 propagating toward optical diffuser 425-n without changing its polarization, and to transmit the second diffused image light 496 propagating toward the first optical diffuser 422 without changing its polarization. Optical retarder 427-n is configured to transmit the second image light 490-2 as third image light having the first polarization so that the third image light is diffused at optical diffuser 425-n, and to transmit the diffused third image light output from the optical diffuser 425-n as the second diffused image light 496 having the second polarization.

In another example, as shown in FIG. 4E, to have optical diffuser 425-2 act as second optical diffuser 424 and optical retarder 427-2 function as first optical retarder 426, the states of optical retarders 427-1 are set to be "on" and the state of optical retarder 427-2 is set to be "off." In this way, optical retarder 427-1 is configured to transmit the second image light 490-2 propagating toward optical diffuser 425-2 without changing its polarization, and to transmit the second diffused image light 496 propagating toward the first optical diffuser 422 without changing its polarization.

Thus, in some embodiments, the second optical diffuser 424 can be any of optical diffusers 425-1, 425-2, and 425-n. As such, there can be one or more third optical diffusers between first optical diffuser 422 and second optical diffuser 424, and/or, there can be one or more fourth optical diffusers that are not between first optical diffuser 422 and second optical diffuser.

In some embodiments, optical retarders 427 may include switchable optical retarders as well as optical retarders that are not switchable (e.g., not active optical elements). For example, as shown in FIG. 4D, optical retarders 427-1 through 427-(n−1) are switchable optical retarders and optical retarders 427-n is not required to be a switchable optical retarder.

Figure 4F:
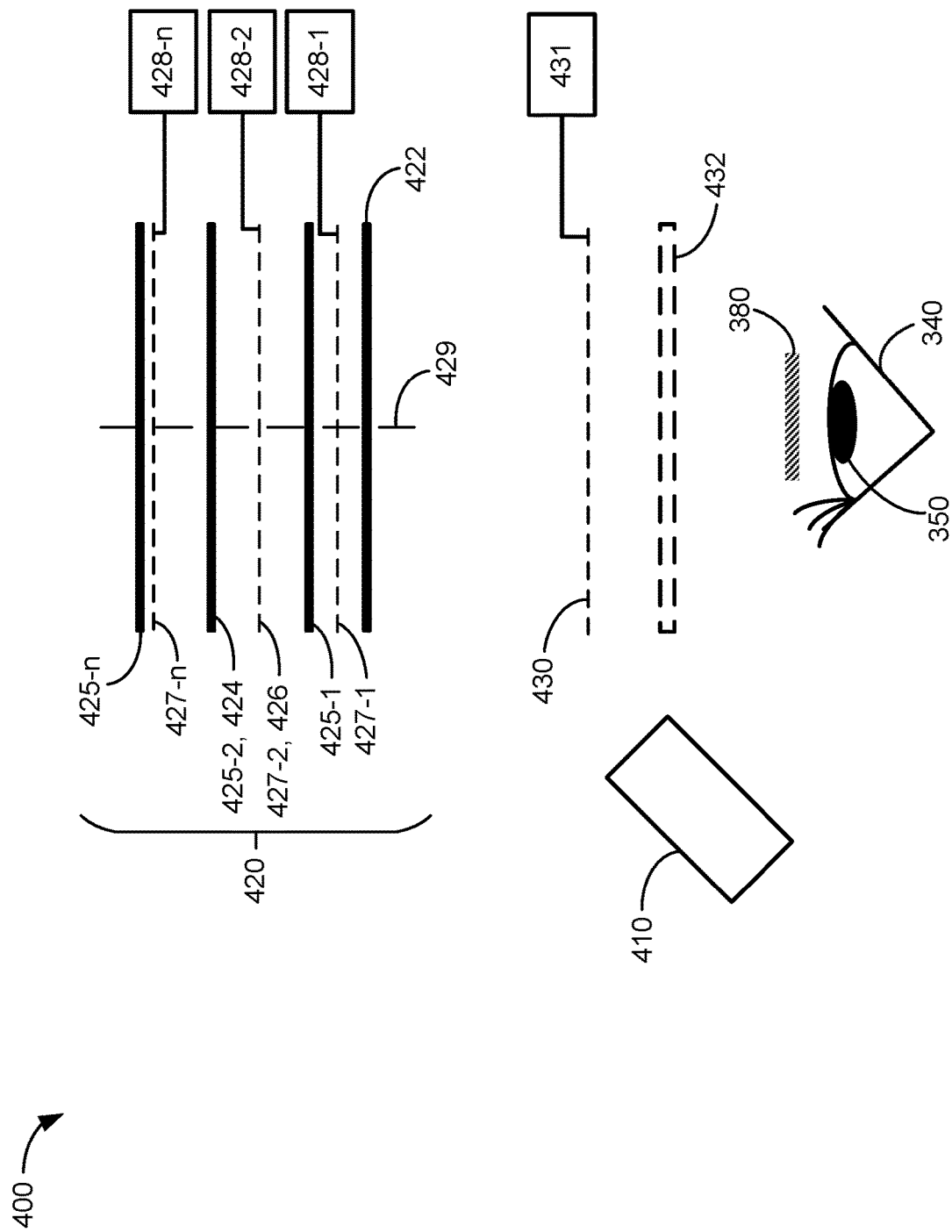
Figure 4H:
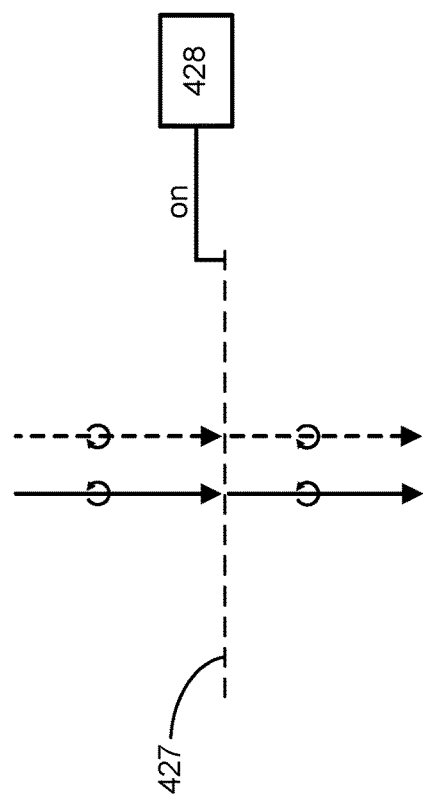
FIGS. 4G-4H are schematic diagrams illustrating operation of a switchable optical retarder in a display device in accordance with some embodiments.
Figure 4G:
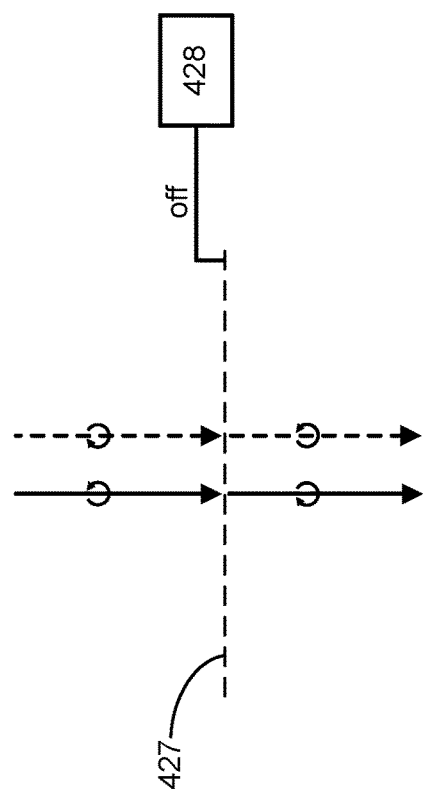

As shown in FIG. 4G, when a switchable optical retarder (e.g., an optical retarder 427) is configured to be in the "off" state, the switchable optical retarder is configured to convert the polarization of incident light from an incident polarization to an orthogonal polarization. For example, as shown in FIG. 4D, switchable optical retarder 427-n, in the "off" state, is configured to convert the polarization of second image light 490-2, transmitted through the first optical diffuser 422, from the second polarization to the first polarization.

As shown in FIG. 4H, when a switchable optical retarder is configured to be in the "on" state, the switchable optical retarder is configured to transmit incident light transmitted without changing its polarization. For example, as shown in FIG. 4E, optical retarder 427-1, in the "on" state, is configured to transmit second image light 490-2, transmitted through the first optical diffuser 422, without changing its polarization.

Referring to FIG. 4F, in some embodiments, the first optical diffuser 422 and the second optical diffuser 424 of display device 400 have a same optical axis 429, and the image source 410 is disposed at an off-axis position relative to the optical axis 429. Additional details regarding the image source 410 are provided below with respect to FIGS. 4L-4M.

Referring to FIG. 4F, in some embodiments, display device 400 includes a lens assembly 432 and a switchable optical retarder 430 disposed between the display 420 and the lens assembly 432. Switchable optical retarder 430 is electrically coupled to controller 431, and operation of the switchable optical retarder 430 is described above with respect to FIGS. 4G and 4H. In some embodiments, as shown in FIG. 4I, when the image source 410 is configured to output the first image light 490-1, the switchable optical retarder 430 is configured to be in a first state (e.g., in this example, an "off" state). Switchable optical retarder 430, in the first state, is configured to receive the first diffused image light 492 and to output third diffused image light 497-1 having third polarization. In some embodiments, as shown in FIG. 4J, when the image source 10 is configured to output second image light 490-2, the switchable optical retarder 430 is configured to be in a second state. Switchable optical retarder 430, in the second state (e.g., in this example, an "on" state), is configured to receive the second diffused image light 496 and to output fourth diffused image light 497-2 having the third polarization. Thus, regardless of whether the image source 410 is configured to output the first image light 490-1 or the second image light 490-2, switchable optical retarder 430, in the first state or the second state, is configured to output diffused image light having the third polarization. Although FIGS. 4I and 4J show the third polarization being the same as the second polarization, the third polarization may be the same as either the first polarization or the second polarization (e.g., the third polarization can be either LCP or RCP).

Figure 4K:
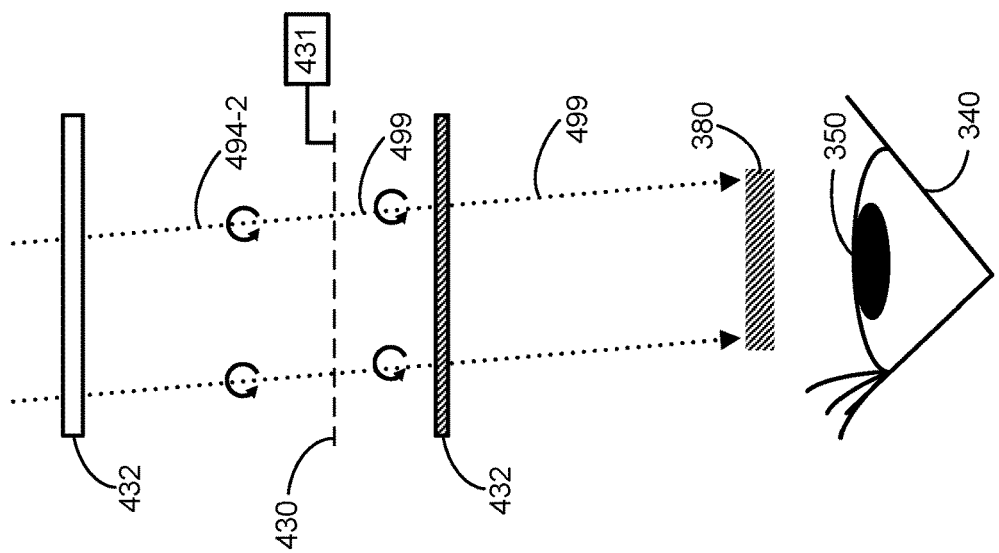
FIGS. 4I-4K are schematic diagrams illustrating optical paths of light in an optical lens assembly of a display device in accordance with some embodiments.
Figure 4J:
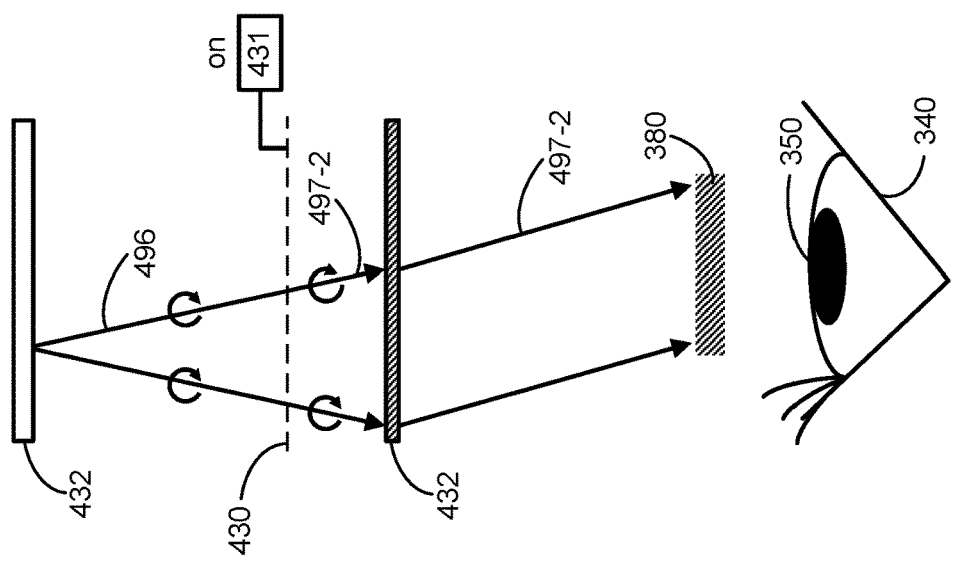
Figure 4I:
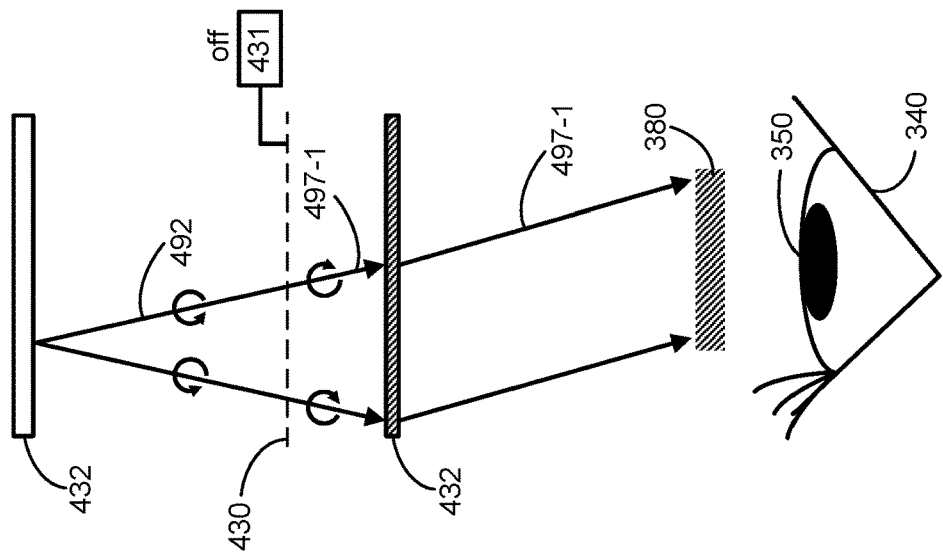

In some embodiments, as shown in FIG. 4K, the switchable optical retarder 430 is also configurable to receive the second portion 494-2 of ambient light 494 that has been transmitted through display 420, and to output second ambient light 499 having a fourth polarization that is different from (e.g., orthogonal to) the third polarization regardless of whether the switchable optical retarder 430 is in the first state or the second state. For example, as shown in FIGS. 4I-4K, when the diffused image light 497-1 and 497-2 output from the switchable optical retarder 430 is LCP light, the second ambient light 499 output from the switchable optical retarder 430 is RCP light. Alternatively, when the diffused image light 497-1 and 497-2 output from the switchable optical retarder 430 is RCP light, the second ambient light 499 output from the switchable optical retarder 430 is LCP light.

In some embodiments, as shown in FIGS. 4I-4K, the lens assembly 432 is a polarization selective lens assembly. The lens assembly 432 is configured to, based on the polarization of light incident upon the lens assembly 432, transmit the incident light at either a first optical power or a second optical power. For example, as shown in FIGS. 4I-4K, the lens assembly 432 is configured to receive the diffused image light 497-1 and 497-2 output from the switchable optical retarder 430 and having the third polarization, and to direct (e.g., focus, substantially collimate) the diffused image light 497-1 and 497-2 at a first optical power. Lens assembly 432 is also configured to transmit the second ambient light 499, output from the switchable optical retarder 430 and having the fourth polarization, at a second optical power that is different from (e.g., smaller than) the first optical power. In some embodiments, the second optical power is zero. In some embodiments, the lens assembly 432 is configured to transmit second ambient light 499 without adding significant optical aberrations. In some embodiments, the lens assembly 432 may include a pancake lens or a metasurface lens.

Figure 4M:
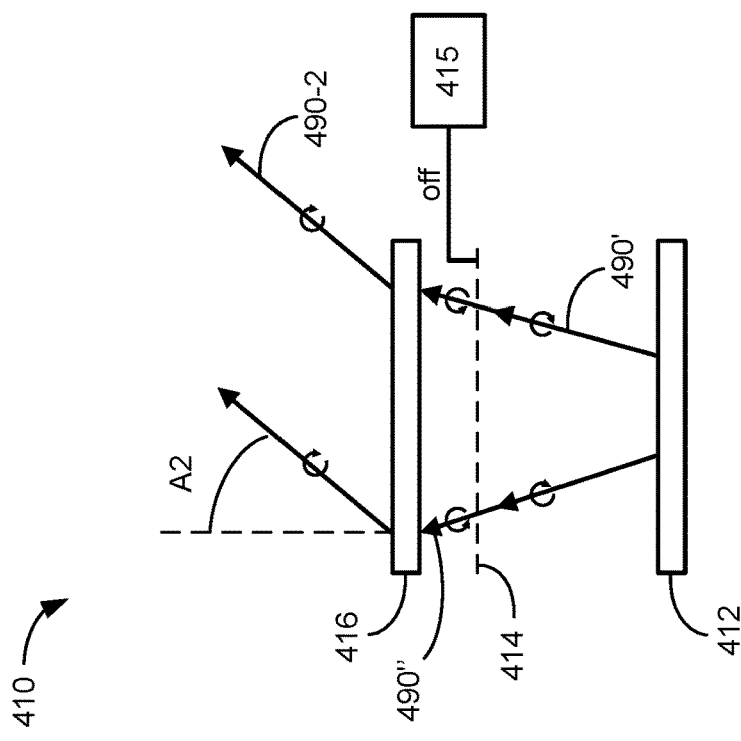
FIGS. 4L-4M are schematic diagrams illustrating a projector in a display device in accordance with some embodiments.
Figure 4L:
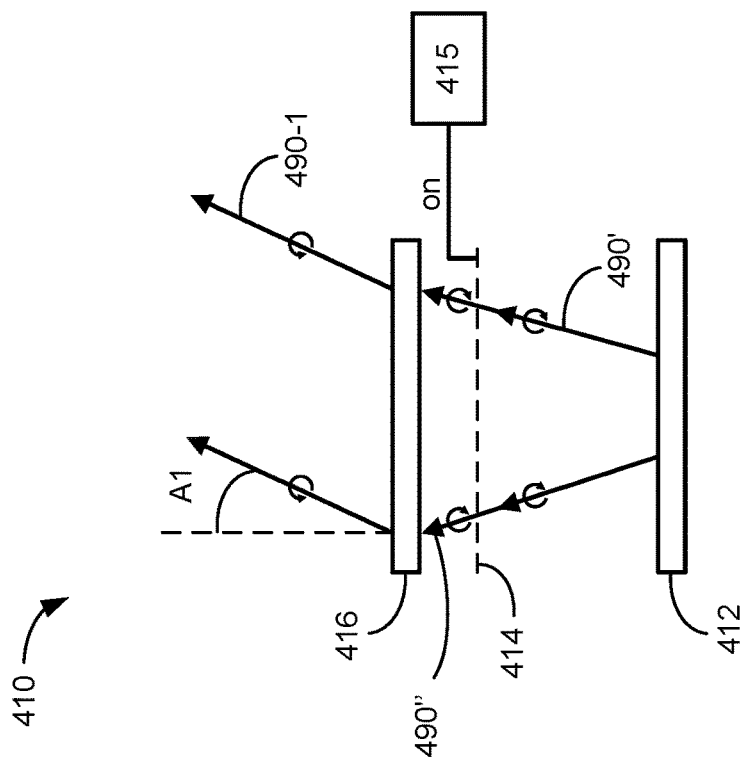

FIGS. 4L-4M are schematic diagrams illustrating an image source 410 in a display device in accordance with some embodiments.

In some embodiments, the image source 410 includes a projector 412 configured to output image light 490' having an initial polarization (e.g., LCP or RCP), a polarization sensitive optical element 416, and a switchable optical retarder 414 disposed between the projector 412 and the polarization sensitive optical element 416. Switchable optical retarder 414 is electrically coupled to controller 415 and operation of the switchable optical retarder 414 is described above with respect to FIGS. 4G and 4H. In some embodiments, the projector 412 is configured to generate linearly polarized light and includes a circular polarizer, such as a quarter wave retarder, that is configured to convert the linearly polarized light into image light 490' having an initial polarization that is a circular polarization (e.g., LCP or RCP).

In some embodiments, switchable optical retarder 414 is configured to receive image light 490' having the initial polarization and to output image light 490", having either the first polarization or the second polarization, toward polarization sensitive optical element 416. Switchable optical retarder 414 is configurable to be in one of a first state and a second state (e.g., an "on" state and an "off" state, or vice versa) and the polarization of the image light 490" depends on the state of the switchable optical retarder 414. Polarization sensitive optical element 416 is configured to receive the image light 490" output from the switchable optical retarder 414, regardless of the polarization of the image light 490", and to project (e.g., steer, direct, diffract) the image light 490" as either the first image light 490-1 or the second image light 490-2, depending on the polarization of the image light 490". When the image light 490" has the second polarization, the polarization sensitive optical element 416 is configured to project the image light 490" as the first image light 490-1 propagating a first direction (e.g., for diffusion by the first optical diffuser 422 shown in FIG. 4A). When the image light 490" has the first polarization, the polarization sensitive optical element 416 is configured to project the image light 490" as the second image light 490-2 propagating in a second direction (e.g., for diffusion by the second optical diffuser 424 shown in FIG. 4A). In some embodiments, when the first optical diffuser 422 is spaced apart from the second optical diffuser 424, the first direction is distinct from the second direction so that the first image light 490-1 projected onto the first optical diffuser 422 is horizontally aligned with the second image light 490-2 projected onto the second optical diffuser 424. In some embodiments, the polarization sensitive optical element 416 is a Pancharatnam-Berry phase optical element (e.g., a geometric phase optical element, a geometric phase grating).

For example, as shown in FIG. 4L, projector 412 outputs the image light 490' having the second polarization (e.g., LCP). When the switchable optical retarder 414 is in the first state (e.g., "on" state), the image light 490' is transmitted as image light 490" without a change in polarization. Polarization sensitive optical element 416 receives the image light 490" having the second polarization and projects (e.g., steers, directs, diffracts) the image light 490" as the first image light 490-1 propagating in the first direction (e.g., having a first angle A1 relative to a surface normal of polarization sensitive optical element 416). Thus, when the switchable optical retarder 414 is in the first state, the first image light 490-1 having the first polarization (e.g., RCP) is output from polarization sensitive optical element 416.

In another example, as shown in FIG. 4M, the projector 412 outputs the image light 490' having the second polarization (e.g., LCP). When switchable optical retarder 414 is in the second state (e.g., "off" state), the image light 490' is converted to image light 490" having the first polarization. Polarization sensitive optical element 416 receives the image light 490" having the first polarization and projects (e.g., steers, directs, diffracts) the image light 490" as the second image light 490-2 propagating in the second direction (e.g., having a second angle A2 relative to a surface normal of polarization sensitive optical element 416). Thus, when the switchable optical retarder 414 is in the second state, the second image light 490-2 having the second polarization (e.g., LCP) is output from the polarization sensitive optical element 416.

Figure 4N:
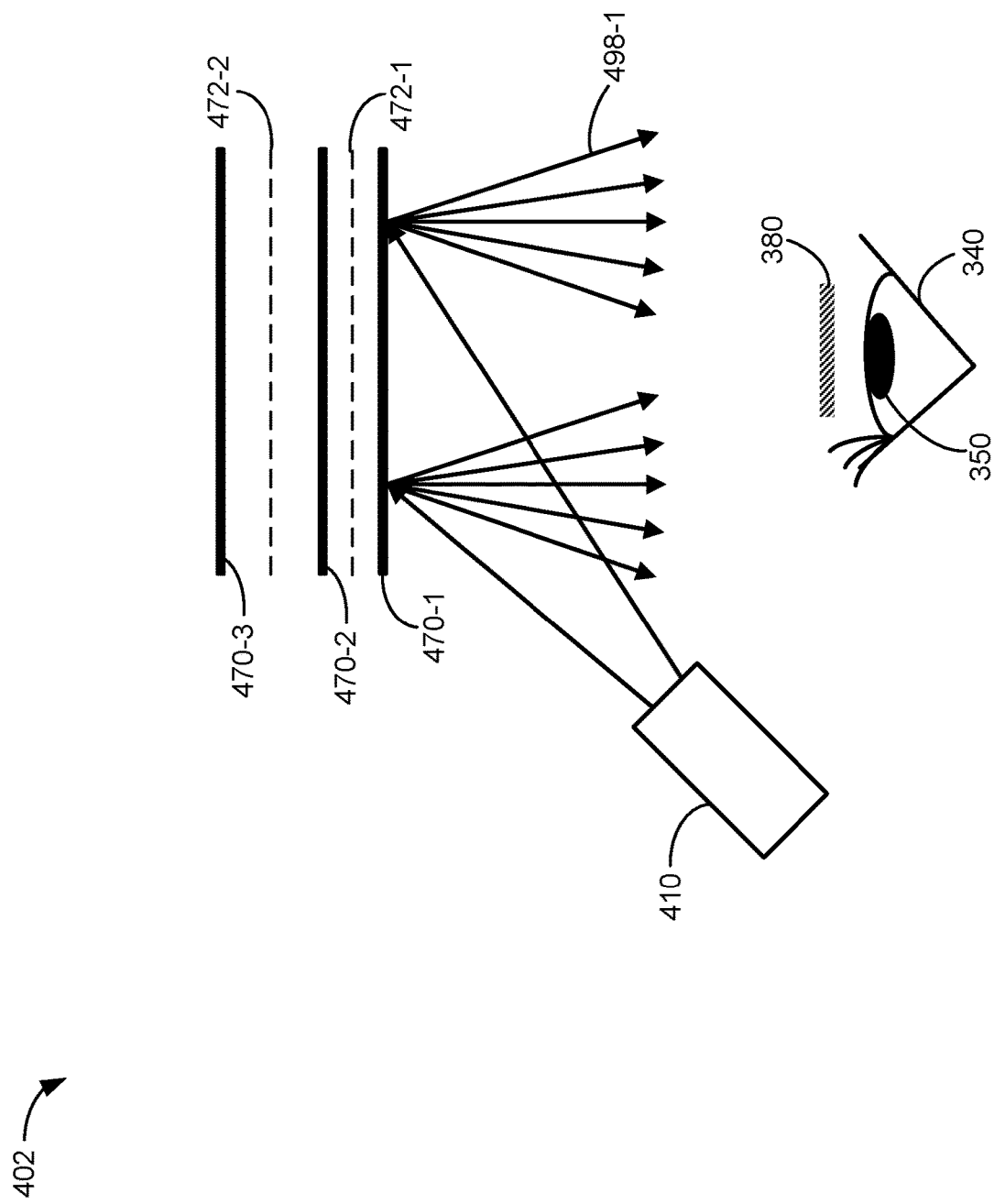
FIGS. 4N-4P illustrate operation of a display device in accordance with some embodiments.
Figure 4O:
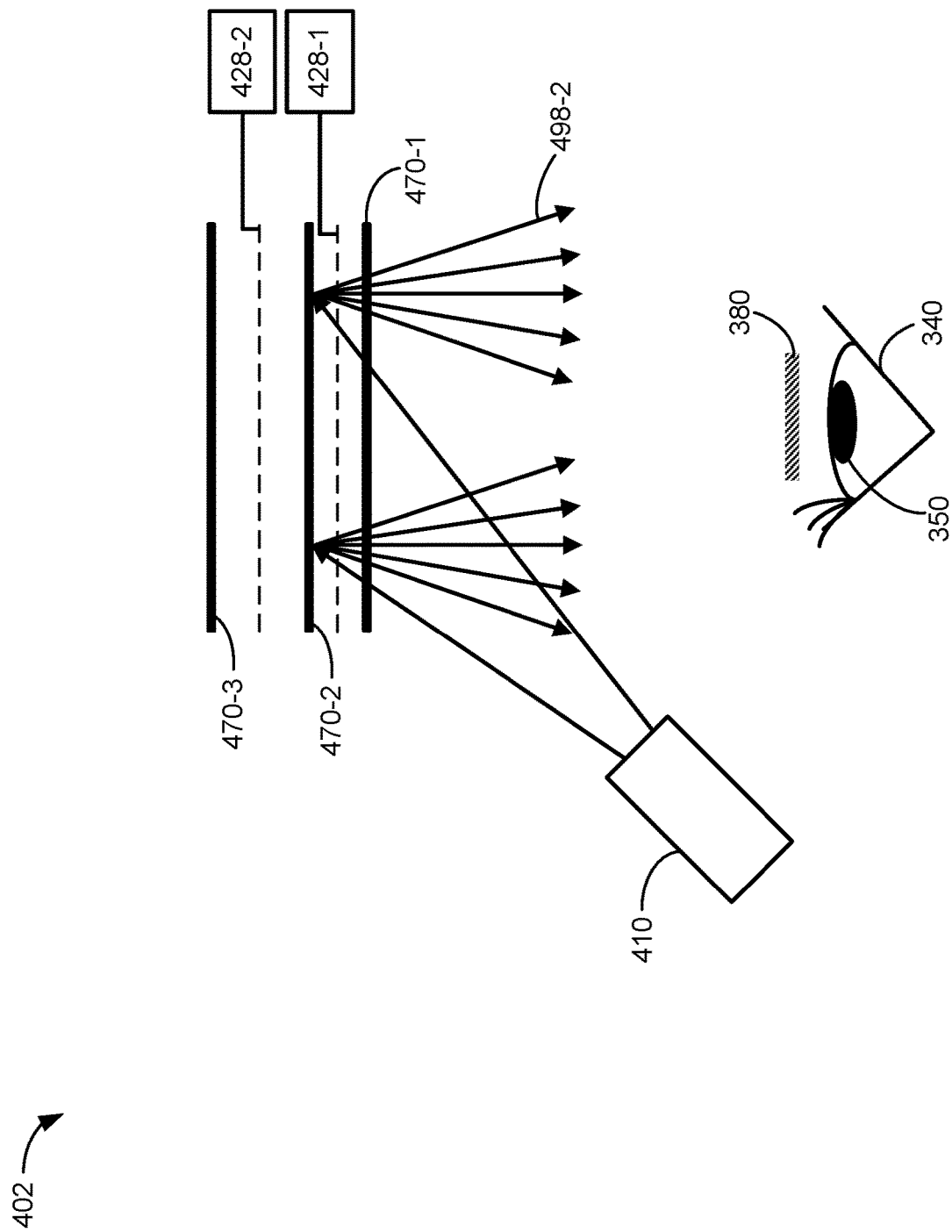
Figure 4P:
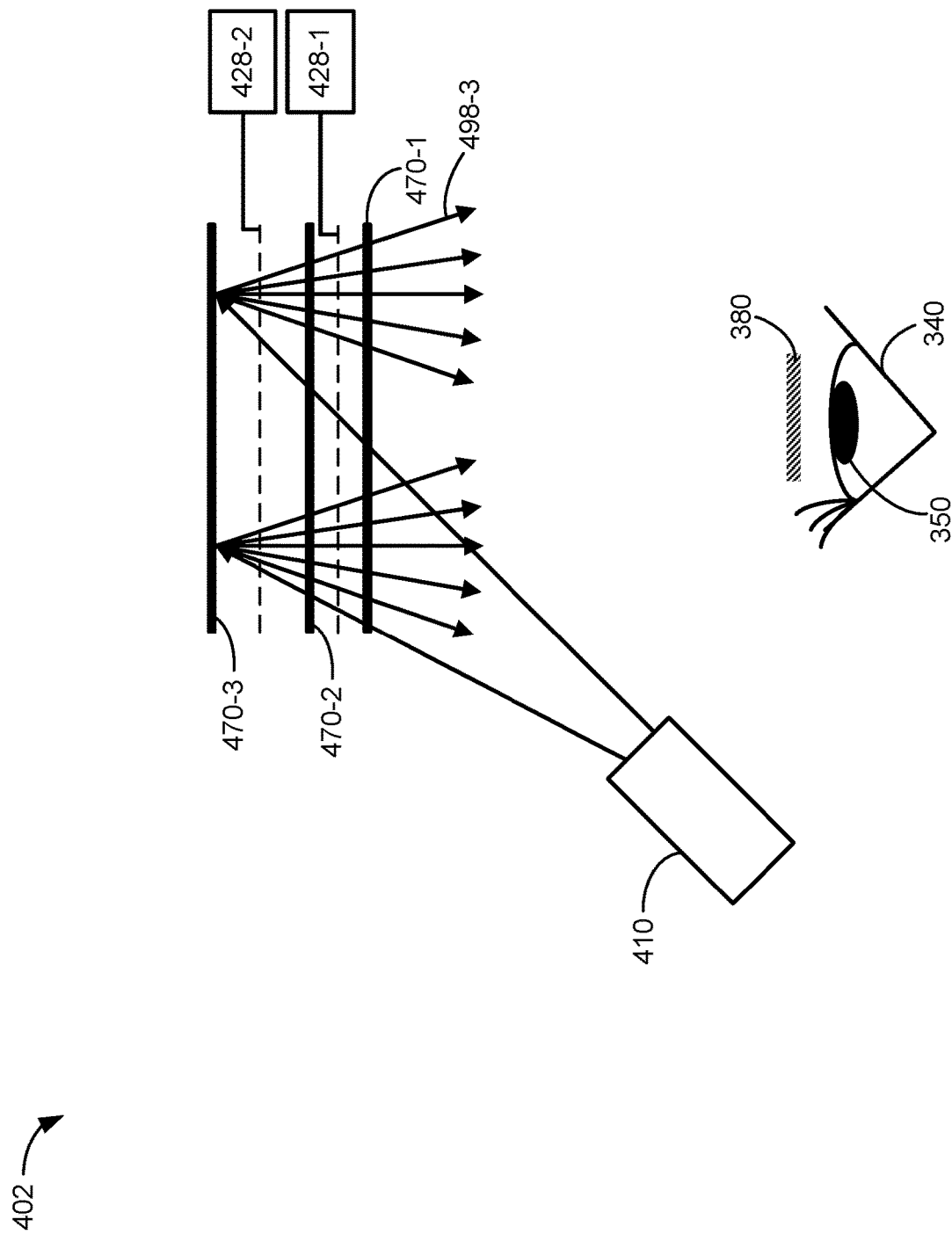

FIGS. 4N-4P illustrate operation of a display device 402, corresponding to display device 400. As shown, display device 402 has a display assembly that includes three optical diffusers: a first optical diffuser 470-1, a second optical diffuser 470-2, and a third optical diffuser 470-3. The display assembly also includes two optical retarders: a first optical retarder 472-1 disposed between the first optical diffuser 470-1 and the second optical diffuser 470-2, and a second optical retarder 472-2 disposed between the second optical diffuser 470-2 and the third optical diffuser 470-3. Details regarding the optical diffusers and optical retarders are provided above with respect to FIGS. 4A-4F and not repeated here for brevity. The display device 402 also includes an image source 410 that is configured to provide (e.g., output, generate, emit, project) image light toward the display assembly. The display device 402 is configured to selectively diffuse the image light from any of the first optical diffuser 470-1, the second optical diffuser 470-2, and the third optical diffuser 470-3. The focal plane of the image projected toward a user's eye 340 can be changed by causing diffusion of the image light at the different optical diffusers of the display device 402. Thus, the display device 402 is able to quickly switch between the three optical diffusers in order to provide a user with a multi-focal image. The switching can be a fast time-sequenced switching process so that a user perceives a single scene with objects located at different focal planes. For example, the images are time sequenced so that they are presented to the user at a high enough frame rate at which each frame is not separately discernable by the human eye 340 (e.g., faster than the flicker fusion threshold). In some embodiments, the frame frequency is greater than 50 Hertz. In some embodiments, the frame frequency is 100 Hertz or higher. For instance, an image may include a dog, a tree, and a house. A first portion of the image light corresponding to the dog may be diffused at the first optical diffuser 470-1 (as shown in FIG. 4N) so that the diffused image light 498-1 presents the user with an image of a dog at a first focal plane, a second portion of the image light corresponding to the tree may be diffused at the second optical diffuser 470-2 (as shown in FIG. 4O) so that the diffused image light 498-2 presents the user with an image of a tree at a second focal plane that is distinct from the first focal plane, and a third portion of the image light corresponding to the house may be diffused at the third optical diffuser 470-3 (as shown in FIG. 4P) so that the diffused image light 498-3 presents the user with an image of a house at a third focal plane that is distinct from the first focal plane and the second focal plane. Thus, by consecutively providing the portions of the image light corresponding to the dog, tree, and house and diffusing the respective portions of the image light at different optical diffusers, a multi-focal image or multi-focal scene can be seamlessly presented to a user.

Figure 5C:
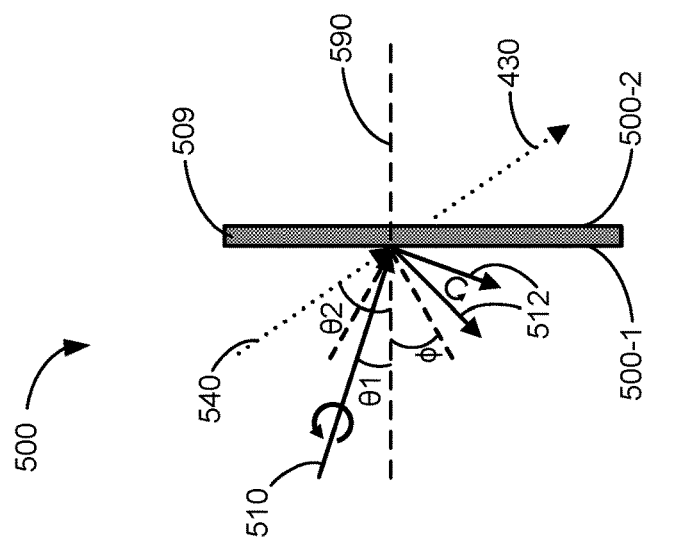
FIGS. 5A-5D are cross-sectional diagrams of a polarization sensitive hologram in accordance with some embodiments
Figure 5B:
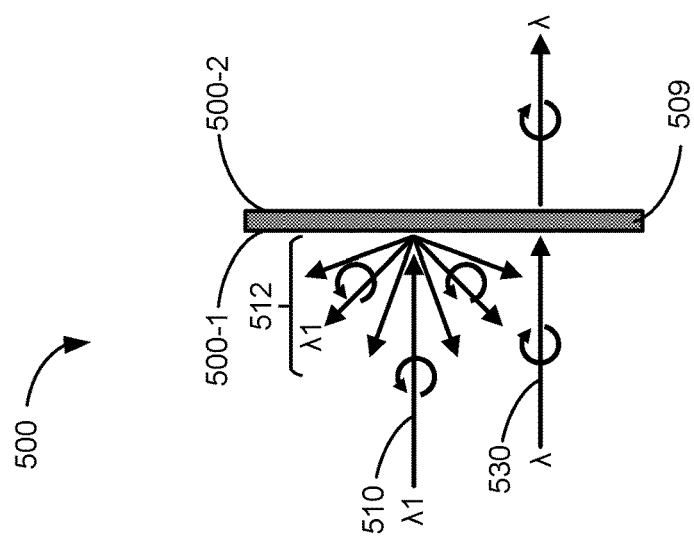
Figure 5A:
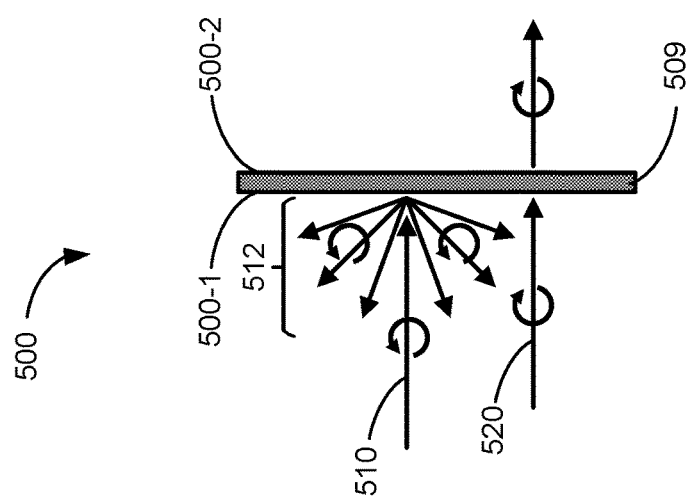

FIGS. 5A-5D are cross-sectional diagrams of polarization sensitive hologram 500, which corresponds to any of the first optical diffuser 422 and the second optical diffusers 424 and 425 in accordance with some embodiments. As shown in FIG. 5A, the polarization sensitive hologram 500 includes a first surface 500-1, a second surface 500-2 that is opposite to the first surface 500-1, and optically anisotropic molecules 509 disposed between the first surface 500-1 and the second surface 500-2. In some embodiments, the polarization sensitive hologram 500 is configured to output light from the first surface 500-1 in response to receiving incident light at the first surface 500-1. As shown, when the incident light (e.g., light 510) has the first circular polarization (e.g., RCP), diffused light 512 having the first circular polarization is output from the first surface 500-1. In some embodiments, the light 510 is substantially collimated and propagating in a first direction. In some embodiments, the polarization sensitive hologram 502 is configured to diffuse the light 510 to output diffused light 512 that propagates in a plurality of directions. When the incident light (e.g., light 520) has the second circular polarization (e.g., LCP), the polarization sensitive hologram 500 is configured to transmit light 520 from the second surface 500-2. In some embodiments, light 520 is transmitted without change in polarization or direction.

In some embodiments, the polarization sensitive hologram 500 may be incident angle selective, and/or wavelength selective.

FIG. 5B illustrates wavelength selectivity of the polarization sensitive hologram 500 in accordance with some embodiments. In some embodiments, the polarization sensitive hologram 500 is configured to diffuse light having the first circular polarization and a wavelength that is within a first predefined spectral range, and to transmit light having a wavelength that is outside of the first predefined spectral range regardless of the polarization of the light.

As shown, light 510, having the first circular polarization and a first wavelength $\lambda 1$ that is within the first predefined spectral range, is incident upon the polarization sensitive hologram 500. Thus, light 510 is diffused at the polarization sensitive hologram 500 and diffused light 512 having the first circular polarization is output from the polarization sensitive hologram 500. On the other hand, light 530, which has a wavelength $\lambda$ that is outside the first predefined spectral range, is transmitted through the polarization sensitive hologram 500 without a change in direction or polarization.

For example, as shown in FIG. 5C, the polarization sensitive hologram 500 can be incident angle selective so that the polarization sensitive hologram 500 interacts differently with incident light having different incident angles with respect to a direction indicated by dashed line 590 that is normal to first surface 500-1. In some embodiments, the polarization sensitive hologram 500 is configured to diffuse light having the first circular polarization and incident upon polarization sensitive hologram 500 at an incident angle that is within a first predefined incident angle range (e.g., smaller than angle $\phi$). In some embodiments, the polarization sensitive hologram 500 is configured to transmit third light that is incident upon the polarization sensitive hologram 500 at an incident angle that is outside of the first predefined incident angle range (e.g., equal or larger than $\phi$), regardless of the polarization of the light.

As shown, light 510 having the first circular polarization can be incident upon the polarization sensitive hologram 500 in a direction that forms a first incident angle $\theta 1$ with respect to line 590. First incident angle $\theta 1$ is within the first predefined incident angle range (e.g., $\theta 1 < \phi$). Thus, light 510 is diffused at the polarization sensitive hologram 500, and diffused light 512 having the first circular polarization is output from the polarization sensitive hologram 500 in response to light 510. On the other hand, light 540 is incident upon the polarization sensitive hologram 500 at a second incident angle $\theta 2$ that is outside the first predefined incident angle range (e.g., $\theta 2 \geq \phi$). Thus, light 540 is transmitted through the polarization sensitive hologram 500 without change in direction or polarization.

Figure 5D:
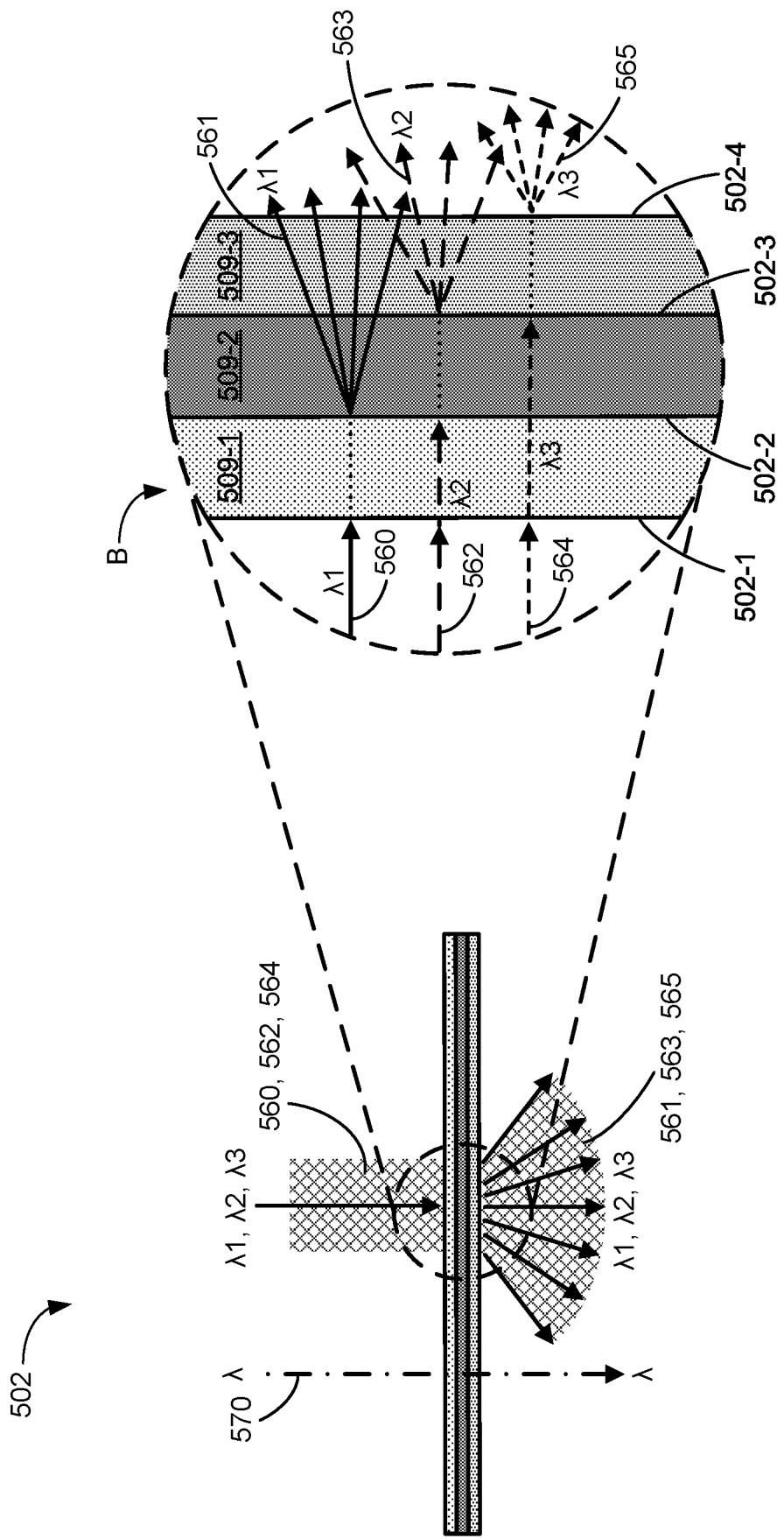

FIG. 5D illustrates optical paths of light transmitted through the polarization sensitive hologram 502 in accordance with some embodiments. In some embodiments, as shown in FIG. 5D, the polarization sensitive hologram 502 includes a plurality of optical diffuser layers (e.g., first optical diffuser layer 551, second optical diffuser layer 552, and third optical diffuser layer 553). A first optical diffuser layer 551 has a first surface 502-1, a second surface 502-2, and optically anisotropic molecules 509-1 disposed between the first surface 502-1 and the second surface 502-2. A third optical diffuser layer 553 has a third surface 502-3, a fourth surface 502-4, and optically anisotropic molecules 509-3 disposed between the third surface 502-3 and the fourth surface 502-4. A second optical diffuser layer 552, has optically anisotropic molecules 509-2 disposed between the second surface 502-2 and the third surface 502-3.

In some embodiments, the first optical diffuser layer 551 is configured to diffuse light having a wavelength that is within a first predefined spectral range, the second optical diffuser layer 552 is configured to diffuse light having a wavelength that is within a second predefined spectral range that is different from the first predefined spectral range, and the third optical diffuser layer 553 is configured to diffuse light having a wavelength that is within a third predefined spectral range that is different from the first predefined spectral range and from the second predefined spectral range. In some embodiments, the polarization sensitive hologram 502 is configured to diffuse light having a wavelength that is within a wider spectral range that encompasses the first predefined spectral range, the second predefined spectral range, and the third predefined spectral range. As shown in inset B, the optically anisotropic molecules 509-1 that are disposed between first surface 502-1 and second surface 502-2 are arranged such that the first optical diffuser layer 551 diffuses light 560 having the first circular polarization and a first wavelength λ1 that is within the first predefined spectral range. Thus, diffuse light 561 having the first wavelength λ1 is output from first optical diffuser layer 551 via second surface 502-2. Optically anisotropic molecules 509-2 that are disposed between the second surface 502-2 and the third surface 502-3 are arranged such that the second optical diffuser layer 552 diffuses light 562 having the first circular polarization and a second wavelength λ2 that is within a second predefined spectral range and transmits diffuse light 561 without change in direction or polarization. Thus, diffuse light 563 having the second wavelength λ2 is output from the second optical diffuser layer 552 through the third surface 502-3. Optically anisotropic molecules 509-3 that are disposed between the third surface 502-3 and the fourth surface 502-4 are arranged such that the third optical diffuser layer diffuses light 640 having the first circular polarization and a third wavelength λ3 that is within a third predefined spectral range and transmits diffuse light 561 and diffuse light 563 without change in direction or polarization. Thus, diffuse light 565 having the third wavelength λ3 is output from the fourth surface 502-4, together with diffuse light 561 and diffuse light 563. Thus, when incident light (e.g., light 560, 562, 564) having the first polarization and wavelength within the wider spectral range encompassing the first predefined spectral range, the second predefined spectral range, and the third predefined spectral range is incident upon the polarization sensitive hologram 502, the polarization sensitive hologram 502 outputs diffuse light (e.g., diffuse light 561, 563, 565) having wavelengths corresponding to the wavelengths of the incident light. Polarization sensitive hologram 502 is also configured to receive light 570 having a wavelength that is outside the wider spectral range encompassing the first predefined spectral range, the second predefined spectral range, and the third predefined spectral range, and transmit the light 570, without change in polarization or direction, regardless of the polarization of the light 570.

In some embodiments, the polarization sensitive hologram 502 may be configured to diffuse light that is incident upon the polarization sensitive hologram 502 with an incident angle that is within a wider incident angle range encompassing a first predefined incident angle range, a second predefined incident angle range that is different from the first predefined incident angle range, or a third predefined incident angle range that is different from the first predefined incident angle range and the second incident angle spectral range. For example, the optically anisotropic molecules 509-1, disposed between the first surface 502-1 and the second surface 502-2, may be arranged such that the first optical diffuser layer diffuses light having the first circular polarization and incident upon polarization sensitive hologram 502 at first angle θ1 that is within the first predefined incident angle range, and outputs diffused first light. Optically anisotropic molecules 509-2, disposed between the second surface 502-2 and the third surface 502-3, are arranged such that the second optical diffuser layer diffuses light having the first circular polarization and incident upon the polarization sensitive hologram 502 at a second angle that is within the second predefined incident angle range, and outputs diffuse light. Optically anisotropic molecules 509-3, disposed between the third surface 502-3 and the fourth surface 502-4, are arranged such that the third optical diffuser layer diffuses light having the first circular polarization and incident upon the polarization sensitive hologram 502 at a third angle that is within the third predefined incident angle range, and outputs diffuse light.

Thus, when incident light having the first polarization is incident upon the polarization sensitive hologram 502 at an incident angle that is within the wider incident angle range encompassing the first predefined incident angle range, the second predefined incident angle range, or the third predefined incident angle range, the polarization sensitive hologram 502 outputs diffuse light. Polarization sensitive hologram 502 is also configured to receive light incident upon the polarization sensitive hologram 502 at an incident angle that is outside the wider incident angle range encompassing the first predefined incident angle range, the second predefined incident angle range, and the third predefined incident angle range, and transmit the light without change in polarization or direction, regardless of the polarization or wavelength of the light.

Although polarization sensitive hologram 502 is shown in FIG. 5D to include three optical diffuser layers, it is understood that the polarization sensitive hologram 502 may include any number of optical diffuser layers.

Figure 6:
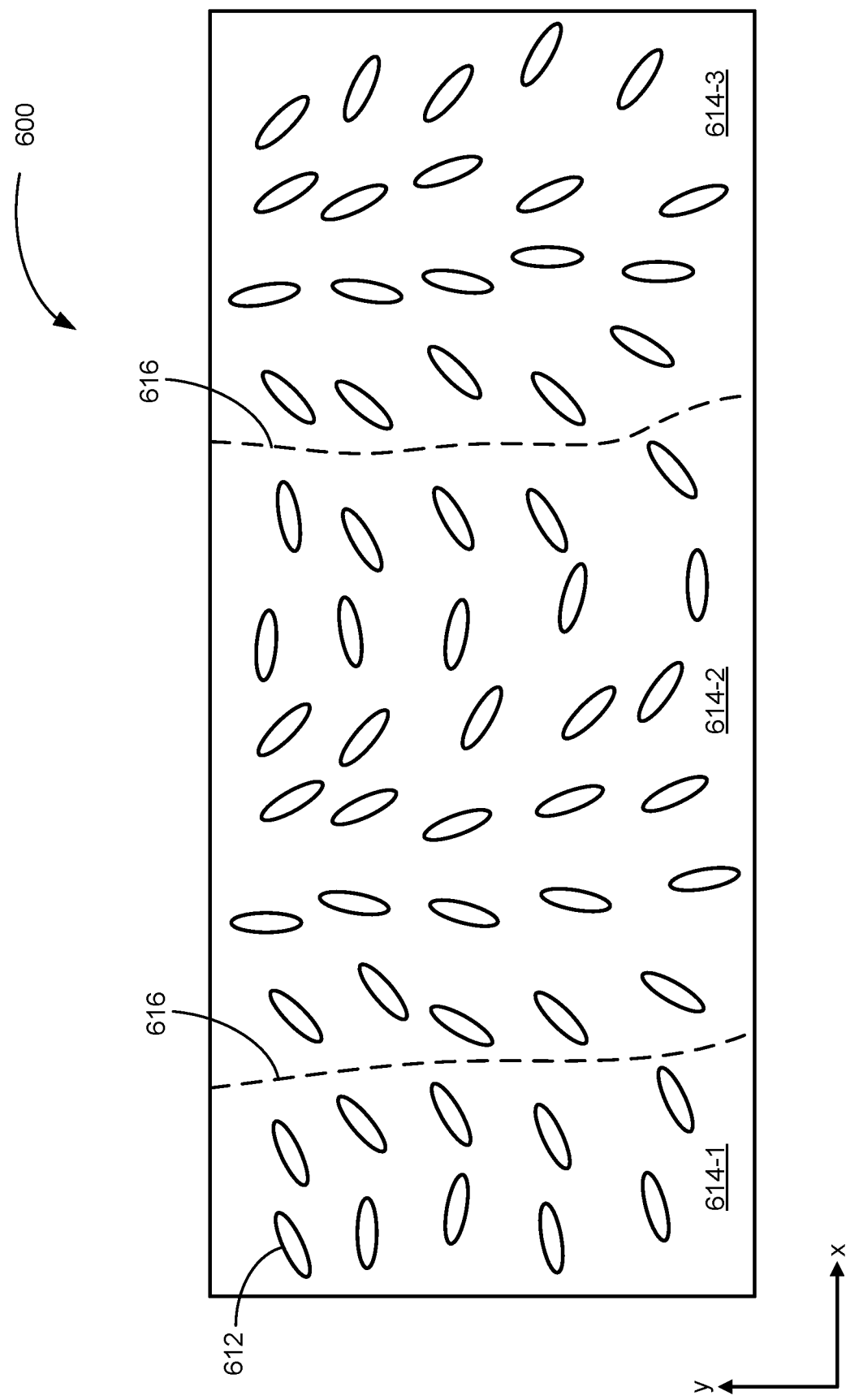
FIG. 6 is a schematic diagram illustrating a polarization sensitive hologram in accordance with some embodiments.

FIG. 6 is a schematic diagram illustrating an optical diffuser 600, corresponding to any of the optical diffusers 422, 424, 425-n, according to some embodiments. Each rod 612 is a representation of an orientation of an optically anisotropic molecule in the optical diffuser 600. Dashed lines 616 demarcate transitions between different domains 614-1, 614-2, and 614-3. In general, the boundaries can be located anywhere in the polarization sensitive optical diffuser. In some embodiments, the boundaries are periodic such that the boundaries are spaced apart evenly (e.g., forming a periodic structure of domains). Although three domains are shown for illustrative purposes, the optical diffuser 600 may have any number of domains.

As shown, optically anisotropic molecules in each domain are aligned to form a grating-like pattern. Thus, in each domain, the optically anisotropic molecules are configured to diffract incident light, having a desired handedness and being within predetermined angular and wavelength ranges, in a specific direction. As shown, the alignment of the optically anisotropic molecules vary slightly between two adjacent domains and thus, optically anisotropic molecules in adjacent domains are configured to diffract the incident light in different directions, resulting in an overall effect of diffuse light being output from the optical diffuser 600. For example, the optically anisotropic molecules in domain 614-1 may be configured to direct (e.g., diffract) the incident light in a first direction, the optically anisotropic molecules in domain 614-2 are configured to direct (e.g., diffract) the incident light in a second direction that is different from the first direction, and the optically anisotropic molecules in domain 614-3 are configured to direct (e.g., diffract) the incident light in a third direction that is different from each of the first and second directions. Thus, the combined effect of diffracting light in slightly different directions at different domains of the optical diffuser 600 results in the incident light being diffused and output as diffuse light. Additionally, just as an optical grating can be designed to redirect light at a predetermined direction (e.g., predetermined angle), the optical diffuser 600 can also be designed to output diffuse light such that a chief ray of the output diffuse light propagates in a predetermined direction (e.g., forms a predetermined angle with respect to a surface of the optical diffuser 600).

In some embodiments, an optical diffuser may include an alignment layer (e.g., a photoalignment layer, a layer including organic or inorganic compounds including photosensitive groups) and helical structures formed by optically anisotropic molecules. In such cases, the alignment layer is formed by adding a layer of photoalignment material on a surface of the optical diffuser. The alignment layer is then exposed to alignment light (e.g., linearly, circularly, or elliptically polarized light) with a desired intensity and incident angle. The alignment light is scanned over the alignment layer while rotating polarization of the alignment light, effectively writing an x-y alignment pattern onto an alignment layer in two dimensions. After preparation of the alignment layer, a layer of optically anisotropic molecules is applied onto the alignment layer, forming helical structures. The x-y alignment pattern of the alignment layer defines the orientation of the helical structures of the optically anisotropic molecules. After formation of the helical structures, the layer of optically anisotropic molecules is firmed (e.g., fixed, set, or cured) to form a polymer. In some embodiments, the firming includes thermal or UV curing. In some embodiments, helical structures are formed of liquid crystals, such as cholesteric liquid crystals. The helical structures are aligned along helical axes. In some embodiments, each of the helical axes are substantially parallel to the z-axis (e.g., each helical axis and the z-axis form an angle less than 1 degree). Alternatively, the helical axes may form a non-zero angle with respect to the z-axis. In some embodiments, the optically anisotropic molecules are rotated in a same rotational direction (forming a helical twist) about a respective helical axis.

In some embodiments, a polarization sensitive optical diffuser does not include an alignment layer and the helical structures of the polarization sensitive optical diffuser are formed without an alignment layer.

In some embodiments, an optical diffuser includes bulk liquid crystal. In such cases, an x-y-z alignment pattern can be written in three dimensions in the bulk liquid crystal material.

FIG. 7 is a flowchart of a method 700 of displaying images in accordance with some embodiments. Method 700 includes (operation 710) providing image light (e.g., image light 490-1, 490-2) from an image source 410 and (operation 720) receiving the image light at a first optical diffuser 422. Method 700 also includes, when the image light received at the first optical diffuser 422 has a first polarization (e.g., image light 490-1), (operation 730) diffusing the image light at the first optical diffuser 422 to output first diffused image light (e.g., first diffused image light 492) having the first polarization. The method 700 further includes (operation 740), when the image light 490-2 received at the first optical diffuser 422 has a second polarization that is different from the first polarization, (i) transmitting the image light 490-2 through the first optical diffuser 422, (ii) converting the image light 490-2 from the second polarization to the first polarization, (iii) diffusing the image light 490-2 having the first polarization at a second optical diffuser 424 to output second diffused image light 496 having the first polarization, (iv) converting the second diffused image light 496 from the first polarization to the second polarization, and (v) transmitting the second diffused image light 496 having the second polarization through the first optical diffuser 422.

In some embodiments, each of the first optical diffuser and the second optical diffuser is configured to diffuse light having the first polarization and to transmit light having the second polarization.

In light of these principles, we now turn to certain embodiments of a varifocal polarization sensitive diffusive display device.

In accordance with some embodiments, a display device (e.g., display device 400) includes an image source (e.g., image source 410) and a display (e.g., display 420). The image source is configured to project image light (e.g., image light 490-1, 490-2). The display includes a first optical diffuser (e.g., first optical diffuser 422) and a second optical diffuser (e.g., second optical diffuser 424). The display is configured to receive the image light, diffuse the image light at the first optical diffuser when the image light has a first polarization, and diffuse the image light at the second optical diffuser when the image light has a second polarization that is different from (e.g., orthogonal to) the first polarization.

In accordance with some embodiments, a display device (e.g., display device 400) includes an image source (e.g., image source 410) configured to project image light (e.g., image light 490-1, 490-2). The image light is configurable to have a first polarization or a second polarization (e.g., LCP or RCP, or vice versa) that is different from the first polarization. The display device also includes a display (e.g., display 420) that includes a first optical diffuser (e.g., first optical diffuser 422) and a second optical diffuser (e.g., second optical diffuser 424). The display is configured to receive the image light, diffuse the image light at the first optical diffuser when the image light is configured to have the first polarization, and diffuse the image light at the second optical diffuser when the image light is configured to have the second polarization.

In some embodiments, each of the first optical diffuser (e.g., first optical diffuser 422) and the second optical diffuser (e.g., second optical diffuser 424) is configured to diffuse first light having the first polarization and to transmit second light having the second polarization.

In some embodiments, the display (e.g., display 420) is further configured to output first diffused image light (e.g., first diffused image light 492) having the first polarization when the image light is configured to have the first polarization (e.g., first image light 490-1). The display is also configured to output second diffused image light (e.g., second diffused image light 496) having the second polarization when the image light is configured to have the second polarization (e.g., second image light 490-2). The first optical diffuser includes a first surface (e.g., first surface 422-A) and is configured to receive the image light at the first surface. The first diffused image light and the second diffused image light are each output from the first surface.

In some embodiments, the display (e.g., display 420) further includes a first optical retarder (e.g., first optical retarder 426) disposed between the first optical diffuser (e.g., first optical diffuser 422) and the second optical diffuser (e.g., second optical diffuser 424). Each of the first optical diffuser and the second optical diffuser is configured to reflectively diffuse light having the first polarization and transmit light having the second polarization. The first optical retarder is configured to receive the image light (e.g., image light 490-2) transmitted through the first optical diffuser. The first optical retarder is configurable to: (i) convert the image light from the second polarization to the first polarization such that the image light (e.g., image light 490-2) is diffused by the second optical diffuser as second diffused image light (e.g., second diffused image light 496) having the first polarization, (ii) receive the second diffused image light, and (iii) convert the second diffused image light from the first polarization to the second polarization so that the second diffused image light is transmitted by the first optical diffuser.

In some embodiments, the display (e.g., display 420) further includes a first optical retarder (e.g., first optical retarder 426) disposed between the first optical diffuser (e.g., first optical diffuser 422) and the second optical diffuser (e.g., second optical diffuser 424). When the image light is configured to have the second polarization (e.g., second image light 490-2), the first optical diffuser is configured to transmit the image light and the first optical retarder is configured to receive the image light transmitted through the first optical diffuser. The first optical retarder is configurable to convert the polarization of the image light from the second polarization to the first polarization such that the image light is diffused by the second optical diffuser as second diffused image light (e.g., second diffused image light 496) having the first polarization. The first optical retarder is also configured to receive the second diffused image light, convert the polarization of the second diffused image light from the first polarization to the second polarization, and to output the second diffuse image light such that the second diffused image light is transmitted by the first optical diffuser.

In some embodiments, the display (e.g., display 420) further includes one or more third optical diffusers (e.g., optical diffusers 425-1 and 425-2) disposed between the first optical diffuser (e.g., first optical diffuser 422) and the second optical retarder (e.g., second optical diffuser 424, 425-n).

In some embodiments, the display (e.g., display 420) further includes one or more second optical retarders (e.g., optical retarders 427-1 and 427-2). Each optical retarder of the one or more second optical retarders corresponds to a respective optical diffuser of the one or more third optical diffusers and is disposed between the respective optical diffuser and the first optical diffuser (e.g., optical retarder 427-1 corresponds to optical diffuser 425-1 and is disposed between optical diffuser 425-1 and first optical diffuser 422). The each optical retarder is configured to transmit the image light (e.g., second image light 490-2) transmitted through the first optical diffuser and propagating toward the second optical diffuser (e.g., second optical diffuser 424, 425-n) without changing its polarization. The each optical retarder is also configured to transmit the first diffused image light (e.g., first diffused image light 492) output from the second optical diffuser and propagating toward the first optical diffuser without changing its polarization.

In some embodiments, the display (e.g., display 420) further includes one or more fourth optical diffusers (e.g., optical diffuser 425-n). The second diffuser (e.g., second optical diffuser 424, 425-2) is disposed between the first optical diffuser (e.g., first optical diffuser 422) and the one or more fourth optical diffusers.

In some embodiments, the display (e.g., display 420) further includes one or more third optical retarders (e.g., optical retarder 427-n). Each optical retarder of the one or more third optical retarders corresponds to a respective optical diffuser of the one or more fourth optical diffusers and is disposed between the respective optical diffuser of the one or more fourth optical diffusers and the second optical diffuser (e.g., optical retarder 427-n corresponds to optical diffuser 425-n and is disposed between optical retarder 427-n and second optical diffuser 424).

In some embodiments, the first optical retarder (e.g., first optical retarder 426) is an active optical retarder (e.g., a switchable optical retarder) configurable to be in any of a first state and a second state (e.g., "on" state and "off" state, or vice versa). In the first state (e.g., "off" state), the optical retarder is configured to convert the polarization of the image light transmitted through the first optical diffuser from the second polarization to the first polarization (e.g., convert the polarization of second image light 490-2 from the second polarization to the first polarization). In the second state, the optical retarder is configured to transmit the image light transmitted through the first optical diffuser without changing its polarization (e.g., transmit second image light 490-2).

In some embodiments, the display device (e.g., display device 400) further includes a first switchable optical retarder (e.g., switchable optical retarder 430) configured to receive any of the first diffused image light (e.g., first diffused image light 492) and the second diffused image light (e.g., second diffused image light 496), and to output third diffused image light (e.g., third diffused image light 497). The first switchable optical retarder is configurable to be in a third state when the image light has the first polarization or a fourth state when the image light has the second polarization (e.g., in an "on" state when first image light 490-1 is output from image source 410 or in an "off" state when second image light 490-2 is output from image source 410, or vice versa). The third diffused image light has a third polarization (e.g., LCP or RCP) regardless of whether the first switchable optical retarder is in the first state or the second state. The display device also includes a lens assembly (e.g., lens assembly 432) configured to receive the third diffused image light output from the first switchable optical retarder, and focus the third diffused image light with a first optical power. The lens assembly is also configured to transmit light (e.g., second ambient light 499) having a fourth polarization different from the third polarization at a second optical power that is different from the first optical power. The first switchable optical retarder is disposed between the display and the lens assembly.

In some embodiments, the display (e.g., display 420) is configured to transmit a portion (e.g., second portion 494-2) of ambient light (e.g., ambient light 494) incident upon the display and the lens assembly is configured to transmit the portion (e.g., second portion 494-2 as second ambient light 499) of ambient light with the second optical power.

In some embodiments, the image source (e.g., image source 410) includes a projector (e.g., projector 412) configured to output image light having an initial polarization (e.g., image light 490'). The image source also includes a second switchable optical retarder (e.g., switchable optical retarder 414) disposed between the projector and the polarization sensitive optical element. The second switchable optical retarder is configured to receive the image light having the initial polarization, and configurable to be in a first state or a second state (e.g., "on" or "off" state, or vice versa). The image light (e.g., image light 490") output from the image source is configured to have the first polarization when the second switchable optical retarder in the first state and the image light output from the image source is configured to have the second polarization when the second switchable optical retarder is in the second state. The image source also includes a polarization sensitive optical element (e.g., polarization sensitive optical element 416) configured to project the image light in a first direction toward the first optical diffuser when the image light is configured to have the first polarization (e.g., project image light 490' as first image light 490-1) and to project the image light in a second direction toward the second optical diffuser when the image light is configured to have the second polarization (e.g., project image light 490' as second image light 490-2).

In some embodiments, the first optical diffuser (e.g., first optical diffuser 422) and the second optical diffuser (e.g., second optical diffuser 424) have a same optical axis (e.g., optical axis 429), and the image source (e.g., image source 410) is located at an off-axis position relative to the optical axis.

In some embodiments, the first optical diffuser (e.g., first optical diffuser 422) is spaced apart from the second optical diffuser (e.g., second optical diffuser 424) by a distance larger than 50 micrometers (e.g., distance D1 and D2 are each no smaller than 50 micrometers).

In some embodiments, each of the first and second optical diffusers (e.g., first optical diffuser 422, second optical diffusers 424 and 425) includes a polarization sensitive hologram (e.g., polarization sensitive hologram 500, 502)

In some embodiments, a respective optical diffuser of the first optical diffuser (e.g., first optical diffuser 422) and the second optical diffuser (e.g., second optical diffusers 424 and 425) includes a first optical surface (e.g., first optical surface 500-1, 502-1), a second optical surface (e.g., second optical surface 500-2, 502-2) opposite to the first optical surface, optically anisotropic molecules (e.g., optically anisotropic molecules 509, 509-1) disposed between the first optical surface and the second optical surface. The optically anisotropic molecules are arranged such that the respective optical diffuser is configured to diffuse the first light (e.g., light 510) having the first polarization and to transmit the second light (e.g., light 520) having the second polarization.

In some embodiments, the first light includes third light in a first wavelength range (e.g., light 560) and fourth light (e.g., light 562) in a second wavelength range. A respective optical diffuser of the first optical diffuser and the second optical diffuser (e.g., first optical diffuser 422, second optical diffusers 424 and 425) includes a first optical surface (e.g., first optical surface 502-1), a second optical surface (e.g., second optical surface 502-2), a third optical surface (e.g., third optical surface 502-3), first optically anisotropic molecules (e.g., optically anisotropic molecules 509-1) disposed between the first optical surface and the second optical surface, and second optically anisotropic molecules (e.g., optically anisotropic molecules 509-2) disposed between the second optical surface and the third optical surface. The first optically anisotropic molecules are arranged to diffuse the third and the second optically anisotropic molecules are arranged to diffuse the fourth light.

In some embodiments, the first light includes fifth light in a first incident angle range and sixth light in a second incident angle range. A respective optical diffuser of the first optical diffuser and the second optical diffuser (e.g., first optical diffuser 422, second optical diffusers 424 and 425) includes a first optical surface (e.g., first optical surface 502-1), a second optical surface (e.g., second optical surface 502-2), a third optical surface (e.g., third optical surface 502-3), first optically anisotropic molecules (e.g., optically anisotropic molecules 509-1) disposed between the first optical surface and the second optical surface, and second optically anisotropic molecules (e.g., optically anisotropic molecules 509-2) disposed between the second optical surface and the third optical surface. The first optically anisotropic molecules are arranged to diffuse the fifth light and the second optically anisotropic molecules are arranged to diffuse the sixth light.

In some embodiments, the optically anisotropic molecules in an optical diffuser are arranged in a plurality of domains. Each domain of the plurality of domains includes a portion of the optically anisotropic molecules forming a grating-like pattern. Portions of optically anisotropic molecules in adjacent domains are configured to diffract the light in different directions.

In accordance with some embodiments, a display device includes a first optical diffuser and a second optical diffuser. The display device is configured to: receive the image light; diffuse the image light at the first optical diffuser when the image light has a first polarization; and diffuse the image light at the second optical diffuser when the image light has a second polarization different from the first polarization. In some embodiments, the display device does not include an image source (e.g., the image source is separate from the display device).

In accordance with some embodiments, a method (e.g., method 700) of displaying images includes (operation 710) providing image light (e.g., image light 490-1, 490-2) and (operation 720) receiving the image light at a first optical diffuser (e.g., first optical diffuser 422). The method also includes (operation 730), diffusing the image light at the first optical diffuser to output first diffused image light (e.g., first diffused image light 492) having the first polarization when the image light has a first polarization (e.g., image light 490-1). The method further includes (operation 740), when the image light has a second polarization that is different from (e.g., orthogonal to) the first polarization (e.g., image light 490-2): (i) transmitting the image light through the first optical diffuser, (ii) converting the image light from the second polarization to the first polarization, (iii) diffusing image light having the first polarization at a second optical diffuser (e.g., second optical diffuser 424) to output second diffused image light having the first polarization, (iv) converting the second diffused image light from the first polarization to the second polarization, and (v) transmitting the second diffused image light having the second polarization through the first optical diffuser.

In accordance with some embodiments, a method (e.g., method 700) of displaying images includes projecting first image light having a first polarization (e.g., image light 490-1) and diffusing the first image light at a first optical diffuser (e.g., first optical diffuser 422) to output first diffused image light (e.g., first diffused image light 492) having the first polarization. The method also includes projecting second image light having a second polarization (e.g., image light 490-2) that is different from (e.g., orthogonal to) the first polarization. The method also includes transmitting the second image light through the first optical diffuser, converting the second image light into third image light having the first polarization, and diffusing the third image light at a second optical diffuser (e.g., second optical diffuser 424) to output second diffused image light. The second diffused image light having the first polarization. The method further includes converting the second diffused image light into third diffused image light having the second polarization, and transmitting the third diffused image light through the first optical diffuser.

In some embodiments, each of the first optical diffuser (e.g., first optical diffuser 422) and the second optical diffuser (e.g., second optical diffuser 424) is configured to diffuse light having the first polarization and to transmit light having the second polarization.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A display device, comprising:
an image source configured to project image light; and
a display including a first optical diffuser and a second optical diffuser,
    wherein each of the first optical diffuser and the second optical diffuser is configured to diffuse first light having a first polarization and to transmit second light having a second polarization different from the first polarization; and
    wherein the display is configured to:
        receive the image light;
        diffuse the image light at the first optical diffuser when the image light has the first polarization; and
        diffuse the image light at the second optical diffuser when the image light has the second polarization.

2. The display device of claim 1, wherein:
the first optical diffuser and the second optical diffuser have a same optical axis; and
the image source is located at an off-axis position relative to the optical axis.

3. The display device of claim 2, wherein the first optical diffuser is spaced apart from the second optical diffuser.

4. The display device of claim 1, the display device further comprising:
a first switchable optical retarder configured to receive any of the first diffused image light and the second diffused image light, and to output third diffused image light, wherein:
    the first switchable optical retarder is configurable to be in a third state when the image light has the first polarization or a fourth state when the image light has the second polarization; and
    the third diffused image light has a third polarization regardless of whether the first switchable optical retarder is in the third state or the fourth state; and
a lens assembly configured to:
    receive the third diffused image light output from the first switchable optical retarder, and focus the third diffused image light with a first optical power; and
    transmit light having a fourth polarization different from the third polarization at a second optical power that is different from the first optical power, wherein the first switchable optical retarder is disposed between the display and the lens assembly.

5. The display device of claim 4, wherein:
the display is configured to transmit a portion of ambient light incident upon the display; and
the lens assembly is configured to transmit the portion of ambient light with the second optical power.

6. The display device of claim 1, wherein each of the first and second optical diffusers includes a polarization sensitive hologram.

7. The display device of claim 5, wherein a respective optical diffuser of the first optical diffuser and the second optical diffuser includes:
a first optical surface;
a second optical surface opposite to the first optical surface; and
optically anisotropic molecules disposed between the first optical surface and the second optical surface, and arranged such that the respective optical diffuser is configured to:
    diffuse the first light having the first polarization; and
    transmit the second light having the second polarization.

8. The display device of claim 1, wherein:
the first light includes third light in a first wavelength range and fourth light in a second wavelength range; and
a respective optical diffuser of the first optical diffuser and the second optical diffuser includes:
    a first optical surface;
    a second optical surface;
    a third optical surface;
    first optically anisotropic molecules arranged to diffuse the third light, and disposed between the first optical surface and the second optical surface; and
    second optically anisotropic molecules arranged to diffuse the fourth light, and disposed between the second optical surface and the third optical surface.

9. The display device of claim 1, wherein:
the first light includes fifth light in a first incident angle range and sixth light in a second incident angle range; and
a respective optical diffuser of the first optical diffuser and the second optical diffuser includes:
    a first optical surface;
    a second optical surface;
    a third optical surface;
    first optically anisotropic molecules arranged to diffuse the fifth light, and disposed between the first optical surface and the second optical surface; and
    second optically anisotropic molecules arranged to diffuse the sixth light, and disposed between the second optical surface and the third optical surface.

10. A display device comprising:
an image source configured to project image light; and
a display including a first optical diffuser and a second optical diffuser, wherein the display is configured to:
    receive the image light;
    diffuse the image light at the first optical diffuser and output first diffused image light having a first polarization when the image light has the first polarization; and
    diffuse the image light at the second optical diffuser and output second diffused image light having a second polarization when the image light has the second polarization, wherein:
        the second polarization is different from the first polarization;
        the first optical diffuser includes a first surface and is configured to receive the image light at the first surface; and
        the first diffused image light and the second diffused image light are each output from the first surface.

11. The display device of claim 10, further comprising:
a first optical retarder disposed between the first optical diffuser and the second optical diffuser, wherein:

each of the first optical diffuser and the second optical diffuser is configured to:
reflectively diffuse light having the first polarization; and
transmit light having the second polarization;
the first optical retarder is configured to receive the image light transmitted through the first optical diffuser; and
the first optical retarder is configurable to:
convert the image light from the second polarization to the first polarization such that the image light is diffused by the second optical diffuser as second diffused image light having the first polarization;
receive the second diffused image light; and
convert the second diffused image light from the first polarization to the second polarization so that the second diffused image light is transmitted by the first optical diffuser.

12. The display device of claim 11, wherein the display further comprises one or more third optical diffusers disposed between the first optical diffuser and the second optical diffuser.

13. The display device of claim 12, wherein the display further comprises:
one or more second optical retarders, each optical retarder of the one or more second optical retarders corresponding to a respective optical diffuser of the one or more third optical diffusers and disposed between the respective optical diffuser and the first optical diffuser, wherein
each optical retarder of the one or more second optical retarders is configured to transmit the image light transmitted through the first optical diffuser toward the second optical diffuser, and to transmit the first diffused image light output from the second optical diffuser toward the first optical diffuser.

14. The display device of claim 11, wherein the display further comprises one or more fourth optical diffusers, wherein the second optical diffuser is disposed between the first optical diffuser and the one or more fourth optical diffusers.

15. The display device of claim 14, wherein the display further comprises:
one or more third optical retarders, each optical retarder of the one or more third optical retarders corresponding to a respective optical diffuser of the one or more fourth optical diffusers and disposed between the respective optical diffuser of the one or more fourth optical diffusers and the second optical diffuser.

16. The display device of claim 11, wherein the first optical retarder is an active optical retarder configurable to be in any of a first state and a second state, and wherein:
in the first state, the first optical retarder is configured to transmit the image light and convert the image light from the second polarization to the first polarization; and
in the second state, the first optical retarder is configured to transmit the image light.

17. A display device comprising:
an image source configured to project image light, wherein the image source includes:
a projector configured to output image light having an initial polarization;
a second switchable optical retarder configured to receive the image light having the initial polarization and configurable to be in a first state or a second state, wherein
the image light output from the image source has a first polarization when the second switchable optical retarder in the first state; and
the image light output from the image source has a second polarization when the second switchable optical retarder is in the second state, the second polarization being different from the first polarization; and
a polarization sensitive optical element, wherein the second switchable optical retarder is disposed between the projector and the polarization sensitive optical element; and
a display including a first optical diffuser and a second optical diffuser, wherein:
the polarization sensitive optical element is configured to:
project the image light in a first direction toward the first optical diffuser when the image light has the first polarization; and
project the image light in a second direction toward the second optical diffuser when the image light has the second polarization; and
the display is configured to:
receive the image light;
diffuse the image light at the first optical diffuser when the image light has the first polarization; and
diffuse the image light at the second optical diffuser when the image light has the second polarization.

18. A method of displaying images, comprising:
providing, from an image source, image light;
receiving the image light at a first optical diffuser;
when the image light received at the first optical diffuser has a first polarization, diffusing the image light at the first optical diffuser to output first diffused image light, the first diffused image light having the first polarization; and
when the image light received at the first optical diffuser has a second polarization different from the first polarization:
transmitting the image light through the first optical diffuser;
converting the image light from the second polarization to the first polarization;
diffusing the image light having the first polarization at a second optical diffuser to output second diffused image light, the second diffused image light having the first polarization;
converting the second diffused image light from the first polarization to the second polarization; and
transmitting the second diffused image light having the second polarization through the first optical diffuser.

19. The method of claim 18, wherein each of the first optical diffuser and the second optical diffuser is configured to diffuse light having the first polarization and to transmit light having the second polarization.

* * * * *